(12) United States Patent
Kato et al.

(10) Patent No.: US 7,306,715 B2
(45) Date of Patent: Dec. 11, 2007

(54) PUMP MODULE

(75) Inventors: Hideki Kato, Toyohashi (JP); Kouji Izutani, Nagoya (JP); Katsuhisa Yamada, Okazaki (JP); Masaaki Konishi, Chiryu (JP)

(73) Assignee: Denso Corporation (JP)

( * ) Notice: Subject to any disclaimer, the term of this patent is extended or adjusted under 35 U.S.C. 154(b) by 299 days.

(21) Appl. No.: 10/627,688

(22) Filed: Jul. 28, 2003

(65) Prior Publication Data

US 2004/0020839 A1 Feb. 5, 2004

(30) Foreign Application Priority Data

| Aug. 5, 2002 | (JP) | .............................. 2002-227697 |
| Aug. 5, 2002 | (JP) | .............................. 2002-227698 |
| Jun. 13, 2003 | (JP) | .............................. 2003-169444 |

(51) Int. Cl.
*B01D 35/153* (2006.01)

(52) U.S. Cl. ....................... 210/136; 123/510; 123/514; 210/137; 210/416.4

(58) Field of Classification Search .................. 210/97, 210/117, 136, 137, 416.4; 123/509–516
See application file for complete search history.

(56) References Cited

U.S. PATENT DOCUMENTS

| 4,352,641 A | 10/1982 | Tuckey |
| 4,447,192 A | 5/1984 | Tuckey |
| 4,820,139 A | 4/1989 | Tuckey |
| 5,044,344 A | 9/1991 | Tuckey et al. |
| 5,392,750 A | 2/1995 | Laue et al. |
| 5,649,514 A | 7/1997 | Okada et al. |

(Continued)

FOREIGN PATENT DOCUMENTS

| EP | 0754483 A1 | 1/1997 |
| EP | 1 160 444 | 5/2001 |
| EP | 1186772 A2 | 3/2002 |
| JP | A-63-71592 | 3/1988 |
| JP | U-2-78758 | 6/1990 |
| JP | A-3-43654 | 2/1991 |

OTHER PUBLICATIONS

Patent Abstracts of Japan, vol. 1998, No. 06, Apr. 30, 1998 & JP 10 047185 A ( Aisan Ind Co Ltd), Feb. 17, 1998.

(Continued)

*Primary Examiner*—Joseph Drodge
(74) *Attorney, Agent, or Firm*—Nixon & Vanderhye P.C.

(57) ABSTRACT

A pump module includes a fuel pump, a fuel filter having a filter casing and a filter element, a fuel outlet, and a pressure regulator. The filter casing covers at least a part of the outer circumference of the fuel pump, and accommodates the filter element. The fuel outlet is disposed outside the outer circumference of the filter casing, and includes an outflow passage for flowing the fuel from a discharge opening disposed on a sidewall of the outer circumference of the filter casing. The outflow passage includes a retrieve passage extending from the discharge opening to the sidewall of the outer circumference of the filter casing. The pressure regulator is disposed outside the outer circumference of the filter casing, and includes a regulator inlet for introducing the fuel, the regulator inlet being opened to the retrieve passage.

42 Claims, 15 Drawing Sheets

U.S. PATENT DOCUMENTS

| | | | |
|---|---|---|---|
| 5,769,061 A | | 6/1998 | Nagata et al. |
| 5,778,926 A | | 7/1998 | Tanaka et al. |
| 5,782,223 A | * | 7/1998 | Yamashita et al. .......... 123/510 |
| 5,785,032 A | | 7/1998 | Yamashita et al. |
| 5,858,227 A | * | 1/1999 | Stone et al. ................ 210/234 |
| 5,900,148 A | | 5/1999 | Izutani et al. |
| 5,908,020 A | | 6/1999 | Boutwell et al. |
| 6,098,600 A | | 8/2000 | Umetsu et al. |
| 6,142,126 A | * | 11/2000 | Kanamaru ................ 123/509 |
| 6,260,540 B1 | | 7/2001 | Hiraiwa |
| 6,293,258 B1 | | 9/2001 | Frank |
| 6,358,412 B1 | | 3/2002 | Strohl et al. |
| 6,439,205 B2 | | 8/2002 | Ushigome |
| 6,453,884 B2 | | 9/2002 | Ushigome |
| 6,520,163 B2 | * | 2/2003 | Yoshioka et al. ........... 123/510 |
| 2001/0027779 A1 | | 10/2001 | Iwai et al. |
| 2002/0026927 A1 | | 3/2002 | Yoshioka |
| 2005/0056257 A1 | * | 3/2005 | Yoshioka et al. ........... 123/457 |

OTHER PUBLICATIONS

French Search Report.

Korean Office Action dated Feb. 27, 2006, issued in Korean Patent Application No. 10-2005-0115306 and translation.

Chinese Office Action dated Jan. 12, 2006, issued in Chinese Patent Application No. 031522068 and translation.

Korean Office Action dated Oct. 30, 2006 in the corresponding Korean Patent Application No. 10-2005-0115306 with English translation.

Japanese Office Action dated Oct. 18, 2006 in the corresponding Japanese Patent Application No. 2002-227698 with English translation.

Japanese Office Action dated Mar. 14, 2007 in the corresponding Japanese Patent Application No. 2003-169444 with English translation.

Japanese Office Action dated Dec. 22, 2006 in the corresponding Japanese Patent Application No. 2003-169444 with English translation.

European Office Action dated Jun. 2, 2006, issued in European Patent Application No. 03017754.7.

* cited by examiner

PUMP MODULE

CROSS REFERENCE TO RELATED APPLICATION

This application is based on Japanese Patent Applications No. 2002-227697 filed on Aug. 5, 2002, No. 2002-227698 filed on Aug. 5, 2002, and No. 2003-169444 filed on Jun. 13, 2003, the disclosure of which is incorporated herein by references.

FIELD OF THE INVENTION

The present invention relates to a pump module having a filter casing disposed on an outer circumferential side of a fuel pump.

BACKGROUND OF THE INVENTION

A pump module is disclosed in U.S. Pat. No. 5,392,750. This pump module includes a fuel filter for accommodating a filter element in a filter casing. The filter casing has a cylindrical shape or an arc-like shape. The fuel filter is disposed on an outer circumference of a fuel pump so that the fuel filter covers the fuel pump.

The pump module includes different parts in addition to the fuel pump and the filter. Therefore, the parts composing the pump module are required to be disposed compactly so that the pump module is minimized in size.

However, when a pressure regulator for regulating fuel pressure discharged from the fuel pump and/or a check valve for preventing the discharged fuel from flowing back to the fuel pump are mounted on the fuel pump, the length of the fuel pump in an axial direction may be lengthened in some cases where the pressure regulator and/or the check valve are mounted on a certain position. For example, the length of the pump module in a center axial direction of an outer circumference of the fuel pump (i.e., the axial direction) becomes longer, since the pressure regulator is disposed on the upside of the filter casing.

Moreover, when the pressure and a suction filter for eliminating contaminants in the fuel sucked by the fuel pump are mounted on the same side of the fuel pump in the axial direction, the pump module becomes larger. That is, the length of the pump module in the axial direction becomes longer, when the pressure regulator and the suction filter are separated each other in the axial direction so as not to contact each other.

Another pump module is disclosed in US-2001-0027779-A1. This pump module includes a pressure regulator disposed on an outer circumference of the fuel filter so that the length of fuel supply equipment in an axial direction is limited from increasing.

However, a pressure regulator is connected to a fuel supply passage for supplying fuel from a fuel filter to an engine. Especially, the fuel supply passage extends from the upper side of the fuel filter, and then the fuel supply passage is bent. The pressure regulator is connected to the passage after being bent. Here, the discharge pressure of the fuel pump is a fuel pressure regulated by the pressure regulator plus a pressure loss of the fuel flowing through the fuel supply passage extending to the pressure regulator. When the fuel supply passage is bent, the pressure loss increases. Therefore, the discharge pressure also increases. As a result, a size of a pump module becomes large for increasing the discharge pressure, and power consumption also increases.

Moreover, since the pressure regulator is disposed outside the outer circumference of the fuel filter through a clearance therebetween, the length of fuel supply equipment in the axial direction becomes longer. Further, since the fuel filter is disposed on the upper side of the fuel pump, the clearance between the bottom of the fuel filter and the fuel tank becomes much larger. Further, since a check valve is disposed on the upper side of the fuel filter and is disposed in the fuel supply passage, the entire length of the pump module in the axial direction becomes longer.

SUMMARY OF THE INVENTION

In view of the above-described problem, it is an object of the present invention to provide a pump module, the length of which in an axial direction of the pump module is shortened even when a pressure regulator is mounted on the pump module, and a fuel pump of the pump module is minimized so that power consumption of the pump module is reduced.

It is another object of the present invention to provide a pump module, each length of which in an axial direction and a radial direction of the pump module is shortened so that the pump module becomes compact even when a pressure regulator is mounted on the pump module.

It is a further object of the present invention to provide a pump module, which is accommodated in a fuel tank even when a distance between a bottom of the fuel filter and an inner bottom surface of the fuel tank becomes small.

It is a still further object of the present invention to provide a pump module, the length of which in an axial direction of the pump module is shortened even when a check valve is mounted on the pump module.

A pump module includes a fuel pump having a center axis of an outer circumference, a fuel filter including a filter casing having an outer circumference and a filter element, a fuel outlet disposed outside the outer circumference of the filter casing, and a pressure regulator for regulating pressure of fuel discharged from the fuel pump through the fuel filter. The filter casing covers at least a part of the outer circumference of the fuel pump. The filter element is accommodated in the filter casing, and eliminates contaminants in the fuel discharged from the fuel pump. The fuel outlet includes an outflow passage for flowing the fuel from a discharge opening of the filter casing. The pressure regulator is disposed outside the outer circumference of the filter casing. The discharge opening is disposed on a sidewall of the outer circumference of the filter casing. The outflow passage includes a retrieve passage extending from the discharge opening to the outer circumference of the filter casing. The pressure regulator includes a regulator inlet for introducing the fuel, the regulator inlet being opened to the retrieve passage.

Since the pressure regulator is disposed outside the outer circumference of the filter casing, at least a part of the pressure regulator overlaps with the filter casing in a range of the center axial direction of the fuel pump. An actual length of the fuel filter and the pressure regulator assembled in the pump module in the axial direction is shorter than a total length summed up each length of the fuel filter and the pressure regulator in the axial direction. Therefore, a whole length of the pump module in the axial direction is shortened even when the pressure regulator is mounted on the pump module.

Further, the retrieve passage extends from the discharge opening disposed on a sidewall of the outer circumference of the filter casing to the outer circumference. The regulator inlet of the pressure regulator for introducing the fuel into the pressure regulator is opened to the retrieve passage. Therefore, the pressure loss according to bending of the fuel supply passage is limited from increasing. Here, the bending is provided from the discharge opening of the filter casing to the pressure regulator.

Moreover, the filter casing includes the discharge opening disposed on a sidewall of the outer circumference of the filter casing. Therefore, in the retrieve passage extending from the discharge opening of the filter casing to the outer circumference, the regulator inlet of the pressure regulator for introducing the fuel into the pressure regulator can be disposed closer to the discharge opening of the filter casing as close as possible. Accordingly, the pressure loss according to a friction loss can be reduced. Here, the friction loss is generated between the fuel and the sidewall of the fuel supply passage, which is disposed between the discharge opening of the filter casing and the pressure regulator. That is, the discharge pressure of the pump does not necessitate for increasing according to increasing of the pressure loss generated between the fuel and the sidewall of the fuel supply passage between the discharge opening of the filter casing and the pressure regulator. Thus, the fuel pump does not necessitate for increasing its size and for increasing its power consumption.

Preferably, the outflow passage includes an outlet passage being bent from the retrieve passage and being parallel to the center axis of the fuel pump, and at least a part of the pressure regulator is disposed between an outlet portion of the fuel outlet having the outlet passage and the sidewall of the outer circumference of the filter casing.

In this case, at least a part of the pressure regulator is disposed in a dead space. The dead space is disposed between the outlet portion of the fuel outlet having the outlet passage and the sidewall of the outer circumference of the filter casing, and is disposed in the radial direction. Here, the outlet passage is bent from the retrieve passage along the center axis. Accordingly, the pressure regulator is disposed in the dead space so that the length of the pump module in the radial direction becomes short. In other words, each length of the pump module in the axial direction and the radial direction of the pump module is shortened so that the pump module becomes compact even when the pressure regulator is mounted on the pump module.

Preferably, the pressure regulator is entirely disposed between the outlet portion of the fuel outlet and the sidewall of the outer circumference of the filter casing. In this case, the pressure regulator is entirely disposed in a dead space. The dead space is disposed between the outlet portion of the fuel outlet having the outlet passage and the sidewall of the outer circumference of the filter casing, and is disposed in the radial direction. Here, the outlet passage is bent from the retrieve passage along the center axis. Accordingly, the pressure regulator is disposed in the dead space so that the length of the pump module in the radial direction becomes short. Moreover, since the pressure regulator entirely overlaps with the filter casing in a range of the axial direction, the length of the pump module in the axial direction becomes short.

Preferably, the pressure regulator discharges the excess fuel to an upper side of the pressure regulator when the pump module is mounted on a fuel tank for accumulating the fuel, and the fuel pump sucks the accumulated fuel. In this case, the pressure regulator discharges the excess fuel to the upper side of the pressure regulator when the pump module is mounted on a fuel tank for accumulating the fuel. Here, the fuel pump sucks the accumulated fuel. Therefore, the fuel discharged from the pressure regulator changes its flowing direction and then flows into the fuel tank. Accordingly, a flow speed of the excess fuel flowing into the fuel tank, so that a vibration of the fuel tank by the excess fuel flowing into the fuel tank is reduced. Thus, the noise of the fuel tank generated by the vibration is also reduced.

Preferably, the pressure regulator is disposed on a sidewall of the outer circumference of the filter casing. Since the pressure regulator is disposed on the sidewall of the outer circumference of the filter casing, at least a part of the pressure regulator overlaps with the filter casing in the range of the axial direction. Moreover, the pressure regulator and the filter casing approach each other in a radial direction. Therefore, the whole size of the pump module in the radial direction and in the axial direction becomes small.

Further, a pump module includes a fuel pump having a center axis of an outer circumference, a fuel filter including a filter casing and a filter element, the filter casing having an outer circumference, a pressure regulator for regulating pressure of fuel discharged from the fuel pump through the fuel filter, and a check valve for preventing the fuel from flowing back to the fuel pump, the fuel being discharged from the fuel pump. The fuel pump includes a discharge portion having an inner circumference for discharging the fuel. The filter casing covers at least a part of the outer circumference of the fuel pump. The filter element is accommodated in the filter casing, and eliminates contaminants in the fuel discharged from the fuel pump. The fuel filter includes a fuel inlet, which is engaged to the inner circumference of the discharge portion in the center axial direction of the fuel pump. The check valve is accommodated in the fuel inlet of the fuel pump.

In this case, the fuel inlet of the filter casing is engaged to the inner circumference of the discharge portion of the fuel pump in the axial direction, and the check valve is accommodated in the fuel inlet. An actual length of the fuel inlet of the filter casing, the discharge portion of the fuel pump, and the check valve assembled in the pump module in the axial direction is shortened. Therefore, the length of the pump module in the axial direction is shortened even when the check valve is mounted on the pump module.

Preferably, the fuel inlet, the discharge portion, and the check valve overlap each other in a range of the center axial direction.

Preferably, the filter casing includes a body and a cover. The body is integrally made of resin, has an opening, and accommodates the filter element. The cover covers the opening of the body. The fuel filter includes a fuel outlet having an outlet passage and a through hole. The fuel outlet connects to the discharge opening of the filter casing, and is made of resin and integrated with the body. The through hole penetrates through the fuel outlet. The pressure regulator is inserted in the through hole of the fuel outlet so that the pressure regulator covers one open end of the through hole, the pressure regulator discharges an excess fuel from the other open end of the through hole, and the pressure regulator includes an inlet passage connecting to the outlet passage of the fuel filter.

In this case, the pressure regulator is inserted in the through hole penetrating through the fuel outlet. The fuel outlet is made of resin and integrated with the body of the filter casing. The inlet passage of the pressure regulator connects to the outflow passage, which is disposed in the fuel outlet of the fuel filter. Therefore, no passage connecting the inlet passage of the pressure regulator and the discharge opening of the filter casing is necessitated. Moreover, the pressure regulator covers the one open end of the through hole, and discharges the fuel from the other open end of the through hole. Therefore, no part for covering the one open end of the through hole is necessitated. Thus, the number of the parts of the pump module can be reduced, so that the assembling step for assembling the pump module is reduced.

Preferably, the filter casing includes a body for accommodating the filter element and a cover for covering an opening of the body, the body being integrally made of resin. In this case, the body of the filter casing is integrally made of resin, so that the number of parts of the pump module is reduced. Thus, the assembling step for assembling the pump module is also reduced.

Preferably, a part of the pressure regulator is disposed in a projection region of the filter casing, the projection region being provided by projecting the filter casing in the center axial direction of the fuel pump. In this case, a part of the pressure regulator is disposed in a projection area of the filter casing. The projection area is provided by projecting the filter casing in the axial direction. The actual length of the fuel filter and the pressure regulator assembled in the pump module in the radial direction is shorter than a total length summed up each length of the fuel filter and the pressure regulator in the radial direction. Here, the radial direction is perpendicular to the axial direction. Therefore, the whole length of the pump module in the radial direction is shortened.

Preferably, a length of the filter casing in the center axial direction of the fuel pump is substantially equal to a length of the fuel pump in the center axial direction. Or a length of the filter element in the center axial direction is substantially equal to a length of the fuel pump in the center axial direction. In this case, the length of the filter casing in the axial direction is substantially equal to that of the fuel pump. Since the position of the filter casing in the axial direction is not shifted with respect to the position of the fuel pump in the axial direction, the length of the pump module in the axial direction is shortened.

Preferably, the discharge portion of the fuel pump is disposed on the center axis of the fuel pump. In this case, the discharge portion of the fuel pump is disposed on the center axis of the fuel pump, so that the fuel flowing through the fuel pump uniformly gathers at the discharge portion and then the fuel is discharged from the discharge portion. Therefore, the fuel flow turbulence in the fuel pump is limited from occurring so that the vibration of the fuel pump is reduced.

Preferably, the filter casing includes an inner cylinder having an outer circumference and an outer cylinder disposed outside the outer circumference of the inner cylinder. The filter casing accommodates the filter element between the inner and outer cylinders. The inner cylinder covers entirely the outer circumference of the fuel pump. An upper periphery of the fuel pump and the inner circumferential sidewall of the inner cylinder provide an upper concavity when the pump module is mounted. The pump module further includes a drain passage for draining water from upside to downside between the fuel pump and the inner cylinder, the drain passage having at least one passage and being disposed between the sidewall of the outer circumference of the fuel pump and the sidewall of the inner circumference of the inner cylinder. The sidewall of the outer circumference of the fuel pump and the sidewall of the inner circumference of the inner cylinder are adhered together or have a clearance therebetween, the clearance preventing water from dropping therethrough.

In the above pump module, the pump module includes the drain passage for draining water from upside to downside through a space between the fuel pump and the filter casing when the pump module is mounted in the vehicle. The drain passage has at least one passage and is disposed between the sidewall of the outer circumference of the fuel pump and the sidewall of the inner circumference of the inner cylinder of the filter casing. Therefore, the water is not accumulated in the upper concavity disposed between the top surface of the fuel pump and the sidewall of the inner circumference of the inner cylinder of the filter casing. Therefore, the parts disposed on the upside of the fuel pump are limited from rusting by the water.

Preferably, the fuel pump includes a discharge portion for discharging the fuel, the discharge portion being disposed on one end of the fuel pump in the center axial direction. The filter casing includes an inner cylinder having an outer circumference, an outer cylinder disposed outside the outer circumference of the inner cylinder, and an accommodation chamber for accommodating the filter element. The accommodation chamber is disposed between the inner and outer cylinders, and has a ring-shape cross-section. The inner cylinder covers the outer circumference of the fuel pump. The fuel pump includes an electric receiving terminal for being electrically connectable to a power supply terminal disposed on one end of a power supply cable, which supplies an electric power to the fuel pump, the electric receiving terminal being disposed on one end of the discharge portion. The filter casing further includes a covert for covering the one end of the discharge portion of the fuel pump, the covert contacting each open periphery of the inner and outer cylinders. The covert includes a fuel passage and a power supply passage. The fuel passage connects to both the discharge portion and the accommodation chamber, and flows the fuel from the discharge portion to the accommodation chamber, the fuel being discharged from the fuel pump. A connection portion between the fuel passage and the discharge portion is sealed. The power supply passage does not connect to the fuel passage and is disposed on the periphery of the power supply terminal of the power supply cable. The power supply terminal is exposed.

In the above pump module, the covert covers the one end of the discharge portion of the fuel pump, and is connected to each open end of the inner and outer cylinders. The covert includes the fuel passage and the power supply passage. The fuel passage connects the discharge portion and the accommodation chamber of the filter element in the filter casing, and flows the fuel, which is discharged from the fuel pump, from the discharge portion to the accommodation chamber. The power supply passage is disposed on the periphery side of the power supply terminal of the power supply cable, so that the power supply terminal is exposed from the power supply passage. The connection portion between the fuel passage and the discharge portion is sealed. Moreover, the power supply passage does not connect to the fuel passage. Since the pump module has the above-described construction, no sealing is necessitated for sealing between the power supply cable and the sidewall of the power supply passage. Therefore, the power supply terminal of the power supply cable and the receiving terminal of the fuel pump can be detached easily. Thus, when the fuel pump is broken, it is easy to detach the cable. Therefore, the maintenance of the pump module is performed easily.

Preferably, the fuel pump includes a metallic pump housing. The filter casing covers entirely the sidewall of the outer circumference of the pump housing, has a cylindrical shape, includes an inner cylinder disposed on the fuel pump side and an outer cylinder disposed outside the outer circumference of the inner cylinder, and is made of non-conductive resin. A distance between the inner cylinder and the pump housing is smaller than a predetermined distance.

In this pump module, the filter casing is made of non-conductive resin, and covers entirely the circumference of the metallic pump housing of the fuel pump. The filter casing having a cylindrical shape includes the inner cylinder and the outer cylinder. The distance between the inner cylinder and the pump housing is below the predetermined distance.

Although the filter casing is made of non-conductive resin, the electric charge can be conducted more or less through the filter casing. Therefore, the distance between the pump housing and the filter casing is set to be a certain distance so that the charge can be discharged from the filter casing to the pump housing of the fuel pump. Therefore, the charge is discharged without adding an additional part and without using the expensive conductive resin. Thus, the electric charge accumulated on the filter casing is discharged from the filter casing to the metallic pump housing.

Preferably, the length of the pressure regulator in the center axial direction of the fuel pump is longer than a distance between a bottom surface of the filter casing and an inner bottom surface of the fuel tank, when the pump module is mounted on a fuel tank for accumulating the fuel. The fuel pump sucks the accumulated fuel.

In this pump module, the filter casing covers at least a part of the outer circumference of the fuel pump. When the pump module is mounted in the tank, the length of the pressure regulator in the axial direction is longer than the distance between the bottom surface of the filter casing and the inner bottom surface of the fuel tank. Accordingly, since the filter casing covers at least a part of the outer circumference of the fuel pump, a space between the bottom surface of the filter casing and the inner bottom surface of the fuel tank can be reduced.

Moreover, in a case of fuel supply equipment that the pressure regulator cannot be disposed between the bottom surface of the filter casing and the inner bottom surface of the tank, the pressure regulator is disposed outside the outer circumference of the filter casing because of reducing the space so that the length of the pump module in the axial direction is shortened. Thus, the pump module is accommodated in the tank. In other words, the pump module can be accommodated in the fuel tank even when the distance between the bottom of the fuel filter and the inner bottom surface of the fuel tank becomes small.

Further, a pump module includes a fuel pump having a center axis of an outer circumference, a fuel filter including a filter casing and a filter element, the filter casing having an outer circumference, and a pressure regulator for regulating pressure of fuel discharged from the fuel pump through the fuel filter. The filter casing covers at least a part of the outer circumference of the fuel pump. The filter element is accommodated in the filter casing, and eliminates contaminants in the fuel discharged from the fuel pump. The pressure regulator is disposed outside the outer circumference of the filter casing. A part of the pressure regulator is disposed in a projection region of the filter casing, the projection region being provided by projecting the filter casing in the center axial direction of the fuel pump.

In this pump module, the length of the pump module in the axial direction of the pump module is shortened even when the pressure regulator is mounted on the pump module, and the fuel pump of the pump module is minimized so that power consumption of the pump module is reduced. Further, each length of the pump module in an axial direction and a radial direction of the pump module is shortened so that the pump module becomes compact even when a pressure regulator is mounted on the pump module. Further, the pump module can be accommodated in a fuel tank even when a distance between a bottom of the fuel filter and the fuel tank becomes small as small as possible. Furthermore, the length of the pump module in an axial direction of the pump module is shortened even when a check valve is mounted on the pump module.

Further, a pump module includes a fuel pump having a center axis of an outer circumference, a fuel filter including a filter casing and a filter element, the filter casing having an outer circumference, and a pressure regulator for regulating pressure of fuel discharged from the fuel pump through the fuel filter. The filter casing covers at least a part of the outer circumference of the fuel pump. The filter element is accommodated in the filter casing, and eliminates contaminants in the fuel discharged from the fuel pump. The pressure regulator is disposed outside the outer circumference of the filter casing. The length of the pressure regulator in the center axial direction of the fuel pump is longer than a distance between a bottom surface of the filter casing and an inner bottom surface of the fuel tank, when the pump module is mounted on a fuel tank for accumulating the fuel. The fuel pump sucks the accumulated fuel.

In this pump module, the pump module becomes compact, and the power consumption of the pump module is reduced. Further, the pump module can be accommodated in a fuel tank even when a distance between a bottom of the fuel filter and the fuel tank becomes small as small as possible.

Further, a pump module includes a fuel pump having a center axis of an outer circumference, a fuel filter including a filter casing and a filter element, the filter casing having an outer circumference, and a pressure regulator for regulating pressure of fuel discharged from the fuel pump through the fuel filter. The filter casing covers at least a part of the outer circumference of the fuel pump, and is disposed around the center axis of the fuel pump. The filter element is accommodated in the filter casing, and eliminates contaminants in the fuel discharged from the fuel pump. The pressure regulator is disposed outside the outer circumference of the filter casing.

In this pump module, the pump module becomes compact, and the power consumption of the pump module is reduced. Further, the pump module can be accommodated in a fuel tank even when a distance between a bottom of the fuel filter and the fuel tank becomes small as small as possible.

Further, a pump module includes a fuel pump having a center axis of an outer circumference, a fuel filter including a filter casing and a filter element, the filter casing having an outer circumference, a suction filter disposed on one end of the fuel pump in an axial direction of the fuel pump, for eliminating contaminants in fuel sucked by the fuel pump, and a pressure regulator disposed on one end of the fuel filter in the axial direction, for regulating pressure of the fuel discharged from the fuel pump through the fuel filter. The filter casing covers at least a part of the outer circumference of the fuel pump, and is disposed around the center axis of the fuel pump. The filter element is accommodated in the filter casing, and eliminates contaminants in the fuel discharged from the fuel pump. The pressure regulator and the suction filter overlap each other in a range of the axial direction.

In this pump module, the pump module becomes compact, and the power consumption of the pump module is reduced. Further, the pump module can be accommodated in a fuel tank even when a distance between a bottom of the fuel filter and the fuel tank becomes small as small as possible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
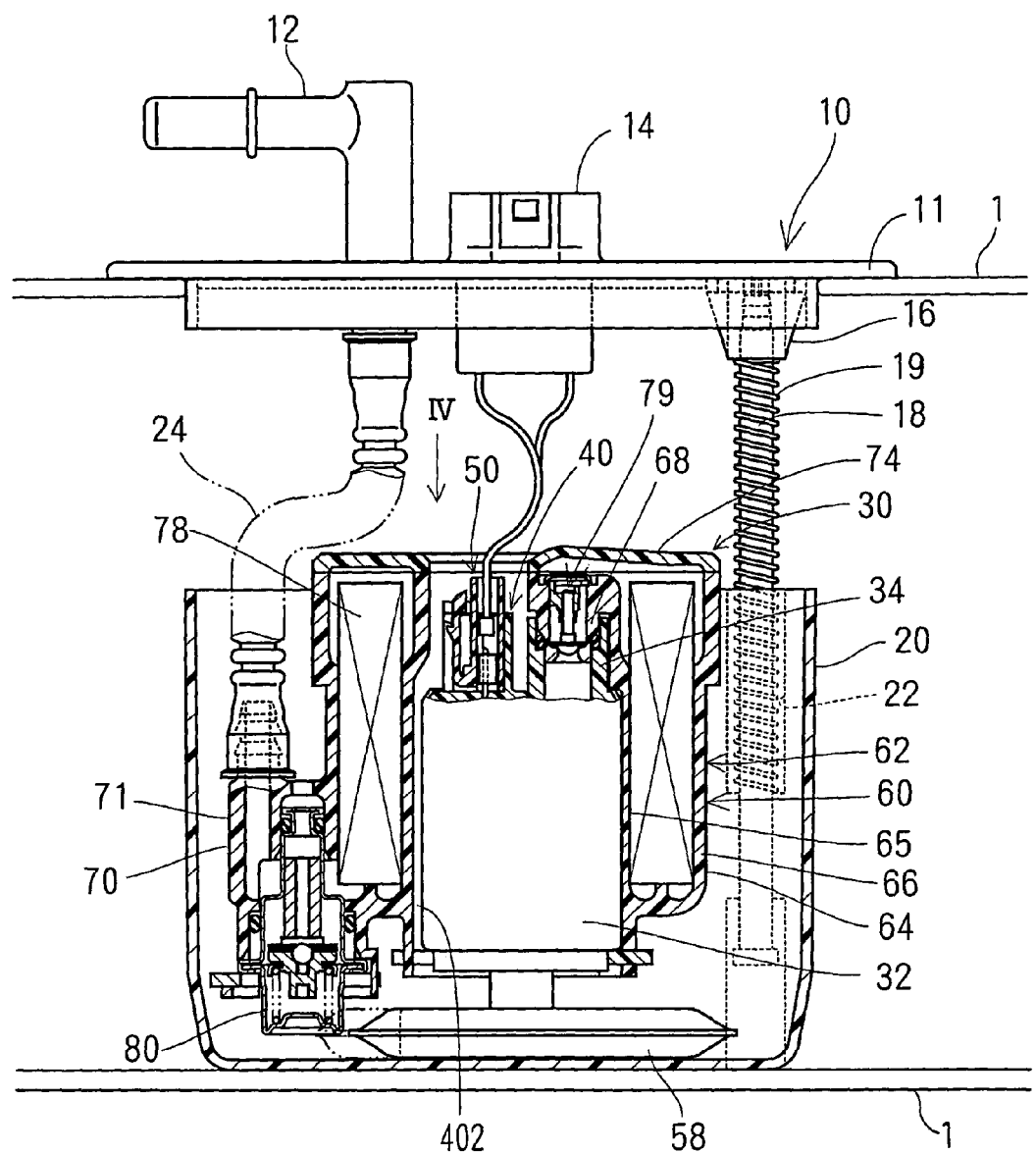
FIG. 1 is a partial cross-sectional view showing fuel supply equipment having a pump module according to the first embodiment of the present invention.

As shown in FIG. 1, fuel supply equipment having a pump module according to the first embodiment is provided. The fuel supply equipment 10 includes an attachment 11, a fuel discharge pipe 12, a connector 14, a metallic pipe 18, a spring 19, a sub-tank 20, a bellows 24, a pump module 30, and the like.

Figure 2:
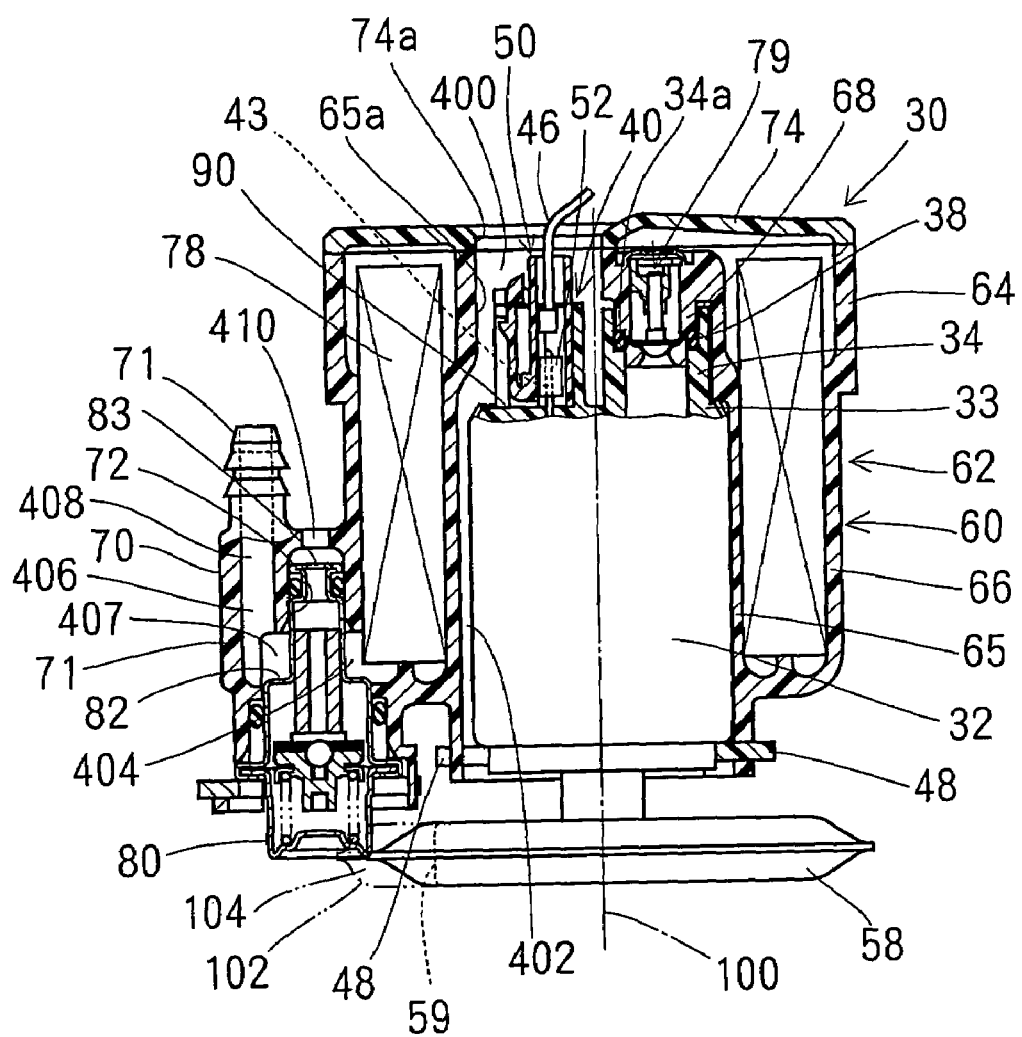
FIG. 2 is a cross-sectional view showing the pump module according to the first embodiment.

The attachment 11 is formed into a disk shape, and mounted on an upper wall of a fuel tank 1 that is integrally made of resin. The other parts of the fuel supply equipment 10 are accommodated in the fuel tank 1. The sub-tank 20 is disposed in the fuel tank 1, and the pump module 30 is accommodated in the sub-tank 20. A fuel pump 32 of the pump module 30 is disposed in the sub-tank 20 so that a center axis 100 of the fuel pump 32 is parallel to the vertical axis, as shown in FIG. 2.

The fuel discharge pipe 12 and the connector 14 are made of resin and integrated with the attachment 11. However, the fuel discharge pipe 12 and the connector 14 can be mounted on the attachment 11 as separate parts. The fuel discharge pipe 12 supplies fuel discharged by the fuel pump 32 from the sub-tank 20 to the outside of the fuel tank 1. The connector 14 electrically connects to a receiving connector 40 through a power supply cable 46 and a power supply connector 50 so that the fuel pump 32 is energized.

One end of the metallic pipe 18 is press-inserted into a first pipe holder 16, which is formed into a cylindrical shape and is disposed under the attachment 11. The other end of the metallic pipe 18 is inserted loosely into a second pipe holder 22, which is disposed in the sub-tank 20. The spring 19 separates the attachment 11 and the sub-tank 20. Therefore, even when the fuel tank 1 made of resin expands and shrinks according to change of an inner pressure caused by temperature change and/or change of a fuel amount, the bottom surface of the sub-tank 20 is always press-contacted to the inner bottom surface of the fuel tank 1 by the spring force of the spring 19.

The upside of the sub-tank 20 opens. A nozzle (not shown) is disposed on the outside of the bottom surface of the sub-tank 20. The nozzle ejects a part of the fuel, which is discharged from the fuel pump 32, into a fuel inlet (not shown) disposed in the sub-tank 20. In this case, a suction force is generated by the ejection of the fuel, so that the fuel in the fuel tank 1 is sucked into the sub-tank 20. The nozzle of the sub-tank provides a jet-pump. The nozzle includes a valve (not shown) for preventing the fuel sucked by the jet-pump from leaking outside the sub-tank 20. Therefore, even when the fuel in the fuel tank 1 decreases, the sub-tank 20 is filled with fuel.

The pump module 30 includes a fuel pump 32, a suction filter 58, a fuel filter 60, a pressure regulator 80 and the like. The suction filter 58 filters comparatively large contaminants in the fuel, which is sucked from the sub-tank 20 by the fuel pump 32. The pressure regulator 80 regulates the fuel pressure at a predetermined pressure, the fuel being discharged from the fuel pump 32 through the fuel filter 60. The fuel filter 60 filters comparatively small contaminants in the fuel discharged from the fuel pump 32.

Figure 3:
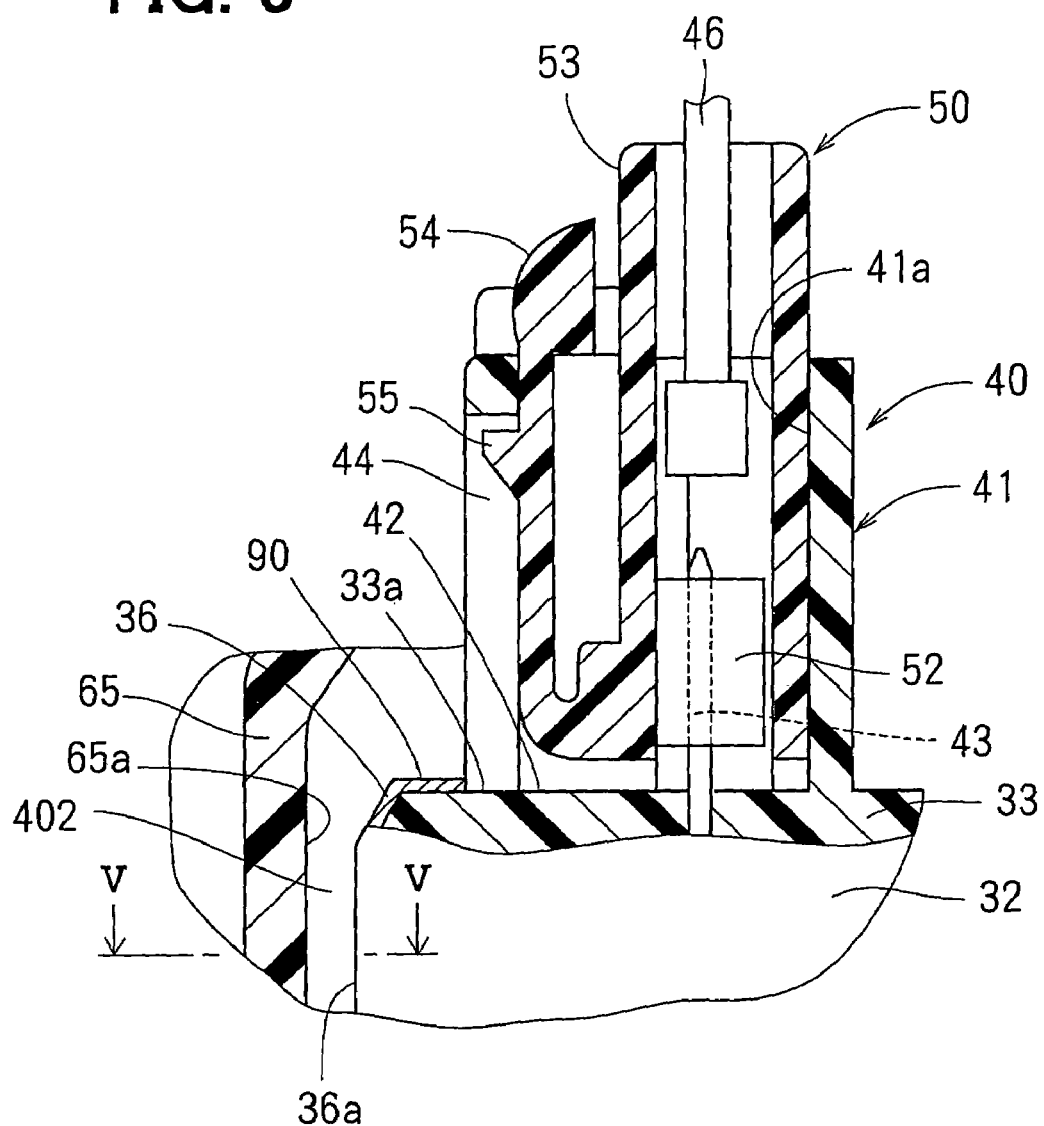
FIG. 3 is an enlarged cross-sectional view showing around a receiving connector of the pump module according to the first embodiment.

The fuel pump 32 has a motor as an electric driving unit (not shown). The motor rotates a rotational part such as an impeller that has vanes disposed on the outer periphery of the impeller. The rotation of the impeller generates a fuel suction force. As shown in FIG. 2, the upside of the fuel pump 32 is covered with a resin cover 33. The resin cover 33 is clamped and fixed to one end of a metallic pump housing 36, as shown in FIG. 3. As shown in FIG. 1, the fuel pump 32 discharges the fuel from the discharge portion 34 of the fuel pump 32. The discharge portion 34 is formed on the resin cover 33. The fuel pump 32 sucks the fuel from the sub-tank 20, and pressurizes the sucked fuel. Then, a part of the pressurized fuel is discharged from the discharge portion 34, and the other part of the pressurized fuel is ejected from the above-described nozzle (not shown), which is disposed on the outside of the bottom surface of the sub-tank 20. The fuel inlet 68 of the filter casing 62 is engaged to the inner circumference of the discharge portion 34. An O-ring 38 seals a space between the inner circumferential wall of the discharge portion 34 and the outer circumferential wall of the fuel inlet 68 of the filter casing 62. The O-ring 38 is fixed by a step 34a, which is formed on the inner circumferential wall of the discharge portion 34. Therefore, the O-ring 38 does not shift in its position.

As shown in FIG. 3, the receiving connector 40 of the fuel pump 32 is formed on the resin cover 33 so that the receiving connector 40 protrudes from the top surface 33a of the resin cover 33. The connector housing 41 of the receiving connector 40 has a cylindrical shape. The connector housing 41 includes a connector concavity 41a for accommodating the power supply connector 50. The inner bottom surface 42 of the connector concavity 41a has the same height as the top surface 33a of the resin cover 33. A receiving terminal 43 is exposed from the connector concavity 41a. The receiving terminal 43 electrically connects to the motor of the fuel pump 32. A through hole 44 is formed in the sidewall of the connector housing 41 so as to penetrate through the sidewall of the connector housing 41. The lower end of the through hole 44 reaches the inner bottom surface 42 of the connector housing 41. The water penetrated into the connector concavity 41a is drained from the connector concavity 41a through the through hole 44. When the receiving connector 50 is inserted toward the connector concavity 41a from the upside of the connector housing 41, a claw 54 of the receiving connector 50 is engaged to the through hole 44 by elastic force. The claw 54 and the through hole 44 are engaged by snap fitting. The claw 54 is elastically deformed so that the receiving connector 50 and the power supply connector 40 can be easily detached. The through hole 44 is used as both a water drain and an engage hole for engaging the claw 54 of the receiving connector 50.

A power supply cable 46 electrically connects a terminal of the connector 14 and the power supply terminal 52 of the power supply connector 50. The connector housing 53 of the power supply connector 50 has the claw 54, which is engaged to the through hole 44 of the receiving connector 40 by the elastic force. The claw 54 has a protrusion 55.

As shown in FIG. 1, the suction filter 58 is disposed downside of the fuel pump 32, which is the other end of the fuel pump 32 in the axial direction. The suction filter 58 is formed of a thick non-woven cloth so that capacity of an amount of the contaminants, which is filtered with the suction filter 58, increases to a large extent.

Figure 4:
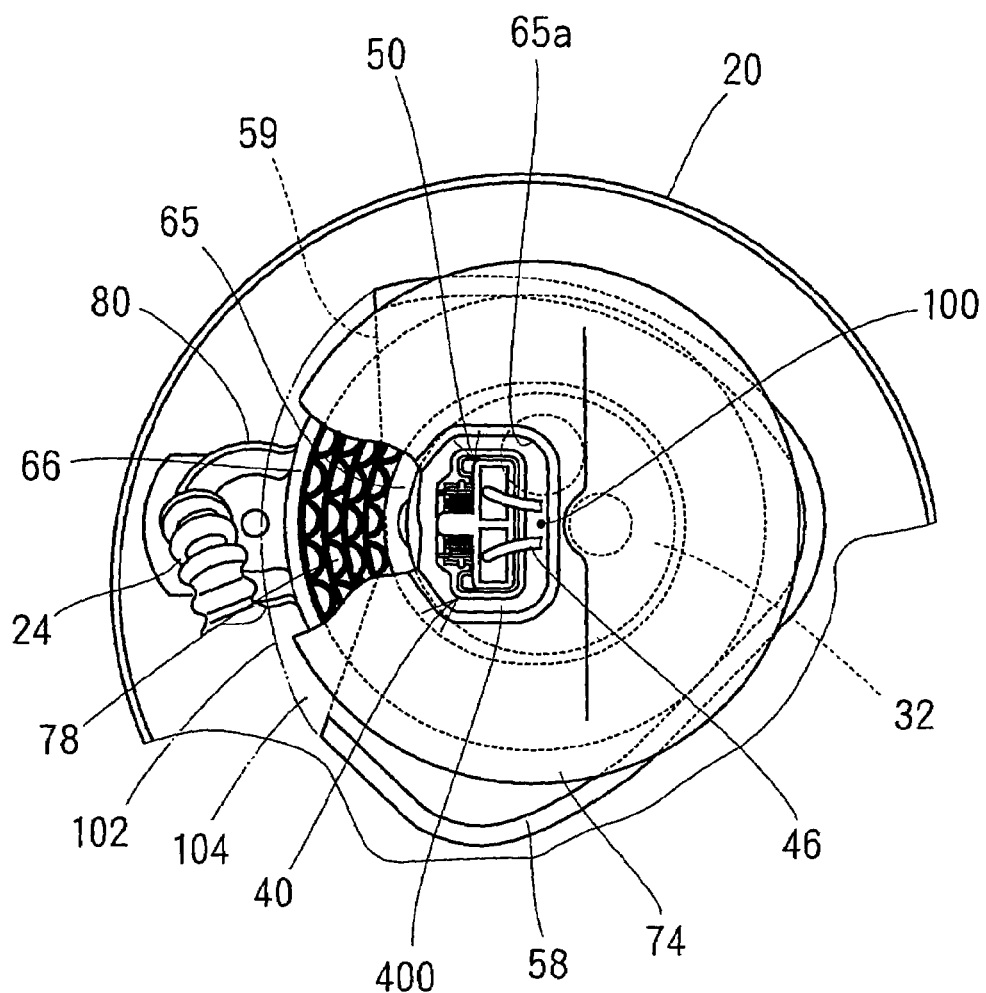
FIG. 4 is a top view on arrow IV in FIG. 1, showing a part of a filter element by breaking a filter casing.

As shown in FIG. 4, a part of the outer circumference of the suction filter 58 is notched so that a concavity 59 is formed. A chain double-dashed line in FIGS. 2 and 4 is an outline 102 of the suction filter 58, in a case where the outer circumference of the suction filter 58 is not notched. The deepest bottom of the concavity 59 is disposed almost on the outer circumference of the inner cylinder 65 of the filter casing 62. The center of the suction filter 58 is almost on the center axis 100 of the fuel pump 32. The center of the suction filter 58 means a center of the suction filter 58 in a case where the outer circumference of the suction filter 58 is not notched.

The fuel filter 60 includes a filter casing 62, a fuel outlet 70, and a filter element 78. A snap ring 48 clamps the lower opening of a body 64. The snap ring 48 is engaged to the fuel pump 32, and prevents the fuel pump from dropping from the filter casing 62. The filter element 78 is accommodated in the filter casing 62, and is made of, for example, filter paper having a honeycomb shape or a chrysanthemum blossom shape.

The filter casing 62 includes the body 64 and a cover 74. The filter casing 62 is formed into a cylindrical shape. The body 64 includes an inner cylinder 65, an outer cylinder 66, and a fuel inlet 68. The inner cylinder 65 covers the outer circumference of the fuel pump 32, and contacts the fuel pump 32. The outer cylinder 66 is disposed outside the outer circumference of the inner cylinder 65. The body 64 is integrally made of resin. The upside of the body 64 is sealed by fitting the cover 74 to the inner and outer cylinders 65, 66.

The inner cylinder 65 covers the entire circumference of the fuel pump 32, and the outer cylinder 66 is disposed outside the outer circumference of the inner cylinder 65 so that the outer cylinder 66 covers the entire circumference of the inner cylinder 65. The downsides of the inner cylinder 65 and the outer cylinder 66 are connected together. The fuel inlet 68 is formed into a cylindrical shape, and is made of resin and integrated with the inner cylinder 65. A check valve 79 is disposed in the fuel inlet 68. The check valve 79 prevents the fuel, which is discharged from the fuel pump 32, from returning to the fuel pump 32. The discharge portion 34, the fuel inlet 68, and the check valve 79 overlap each other in the range of the axial direction.

A discharge opening 404 is disposed downside of the outer cylinder 66, which is disposed outside the outer circumference of the body 64. The discharge opening 404 discharges the fuel passing through the filter element 78. The fuel outlet 70 is made of resin and integrated with the outer cylinder 66. The fuel outlet 70 includes an outflow passage 406, which connects to the discharge opening 404. The outflow passage 406 includes a retrieve passage 407 and an outlet passage 408. The retrieve passage 407 extends from the discharge opening 404 to the outer circumferential side. The outlet passage 408 is bent from the retrieve passage 407 along the center axis 100.

The contaminants in the fuel are eliminated by the filter element 78, and the pressure of the fuel is regulated at a predetermined pressure by the pressure regulator 80. Then, the fuel is discharged from the outlet portion 71 of the fuel outlet 70 having the outlet passage 408. The fuel discharged from the outlet portion 71 is discharged from the fuel discharge pipe 12 through the bellows 24.

The top surface 33a of the resin cover 33, the inner circumferential sidewall 65a of the inner cylinder 65, and the inner circumferential sidewall 74a of the cover 74 provide an upper concavity 90, which is disposed upside of the fuel pump 32. The upside of the upper concavity 90 opens, and provides a power supply passage 400. After the filter casing 62 and the fuel pump 32 are assembled, the power supply connector 50 can be engaged to the receiving connector 40 through the upper opening of the upper concavity 90.

A water drain passage 402 is formed between the inner circumferential sidewall 65a of the inner cylinder 65 and the pump housing 36 of the fuel pump 32. The water drain passage 402 has at least one drain in the circumferential direction. In a place where the water drain passage 402 is not formed, the inner cylinder 65 and the pump housing 36 contact together or have a clearance where the water does not pass through.

Figure 5:
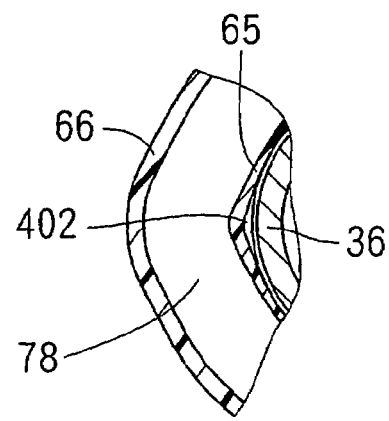
FIG. 5 is a partial cross-sectional view taken along line V-V in FIG. 3.

The water drain passage 402 can be formed using a groove disposed in the inner cylinder 65 and/or the pump housing 36. Preferably, as shown in FIG. 5, the water drain passage 402 is formed by deforming the shape of the inner cylinder 65 slightly. This is for reducing the deformation of the filter element 78 to the utmost.

The above construction provides an operation of the nozzle (not shown) as a jet pump and the valve body (not shown), which prevents the pumped fuel from leaking out of the sub-tank 20. Thus, the sub-tank 20 is filled with the fuel. Even when the fuel in the fuel tank 1 is a small amount, a most part of the fuel can be accumulated in the sub-tank 20. Therefore, regardless of the amount of the fuel in the fuel tank 1, the receiving terminal 43 of the receiving connector 40 and the power supply terminal 52 of the power supply connector 50 are dipped and connected in the fuel accumulated in the sub-tank 20. The water slightly contained in the fuel has a density heavier than that of the fuel. Therefore, the water separates from the fuel and sinks downward. The water sinking to the bottom of the upper concavity 90 passes through the water drain 402 and then drains from the down side of the fuel pump 32. Regardless of the amount of the fuel in the fuel tank 1, the connection portion between the receiving terminal 43 and the power supply terminal 52 is dipped in the fuel. However, the water is not accumulated around the connection portion between the receiving terminal 43 and the power supply terminal 52, so that both the receiving terminal 43 of the receiving connector 40 and the power supply terminal 52 of the power supply connector 50 are prevented from rusting. Therefore, failure of the electrical connection between the receiving terminal 43 and the power supply terminal 52 can be prevented, and the operation failure of the fuel pump 32 is also limited.

The pressure regulator 80 is disposed on the downside of the filter casing 62, which is one end of the filter casing 62 in the axial direction, and is also disposed outside the outer circumference of the body 64. The output passage 83 of the pressure regulator 80 contacts the sidewall of the outer circumference of the body 64. Therefore, the pressure regulator 80 is also disposed on a sidewall of the outer circumference of the filter casing 62. A part of the pressure regulator 80 is disposed in a projection region of the filter casing 62, which is provided by projecting the filter casing 62 in the axial direction.

A part of the pressure regulator 80 is disposed in the projection region of the filter casing 62, which is provided by projecting the filter casing 62 in the axial direction. That is, a part of the pressure regulator 80 is disposed under the filter casing 62 so as to get under the filter casing 62. Therefore, the pressure regulator 80 overlaps with the filter casing 62 in a range of not only the axial direction but also the radial direction.

The pressure regulator 80 is disposed on the same side of the suction filter 58 in the axial direction, so that the pressure regulator 80 overlaps with the suction filter 58 in the range of the axial direction. The downside of the pressure regulator 80 is disposed in a notch region 104, which is formed by notching the outer circumference of the suction filter 58, i.e., the notch region 104 is disposed between the outline 102 of the suction filter 58 and the concavity 59 of the suction filter 58. Here, the outline 102 is an outline of the outer circumference of the suction filter 58 in a case where the outer circumference of the suction filter 58 is not notched. If the part of the outer circumference of the suction filter 58 is not notched and the concavity 59 is not formed, the pressure regulator 80, which is disposed at the position in FIG. 2, is interrupted by the suction filter 58.

When the pump module 30 is accommodated in the sub-tank 20, as shown in FIG. 1, the axial length of the pressure regulator 80 is longer than a distance between the bottom surface of the filter casing 62 and the inner bottom surface of the sub-tank 20.

The pressure regulator 80 is inserted into a through hole 72 of the fuel outlet 70, and a part of the pressure regulator 80 is disposed between the outlet portion 71 of the fuel outlet 70 and the outer cylinder 66 of the filter casing 62. Therefore, the pressure regulator 80 seals one open end of the through hole 72. Thus, no additional part, which seals the one open end of the through hole 72, is necessitated. The inlet passage 82 of the pressure regulator 80 directly connects to the outflow passage 406, which is disposed in the fuel outlet 70. Accordingly, the inlet passage 82 is also used as a regulator inlet. The outlet passage 83 of the pressure regulator 80 connects to the discharge passage 410, which is the other open end of the through hole 72. A part of the fuel flowing from the fuel filter 60 is regulated by the pressure regulator 80. Then, the regulated fuel flows from the outlet portion 71. The excess fuel, which is not regulated by the pressure regulator 80, is returned to the sub-tank 20 through the outlet passage 83 of the pressure regulator 80 and the discharge passage 410. The flow direction of the fuel flowing from the filter casing 62 into the inlet passage 82 of the pressure regulator 80 is opposite to the flow direction of the fuel being discharged from the outlet passage 83 of the pressure regulator 80.

Figure 6:
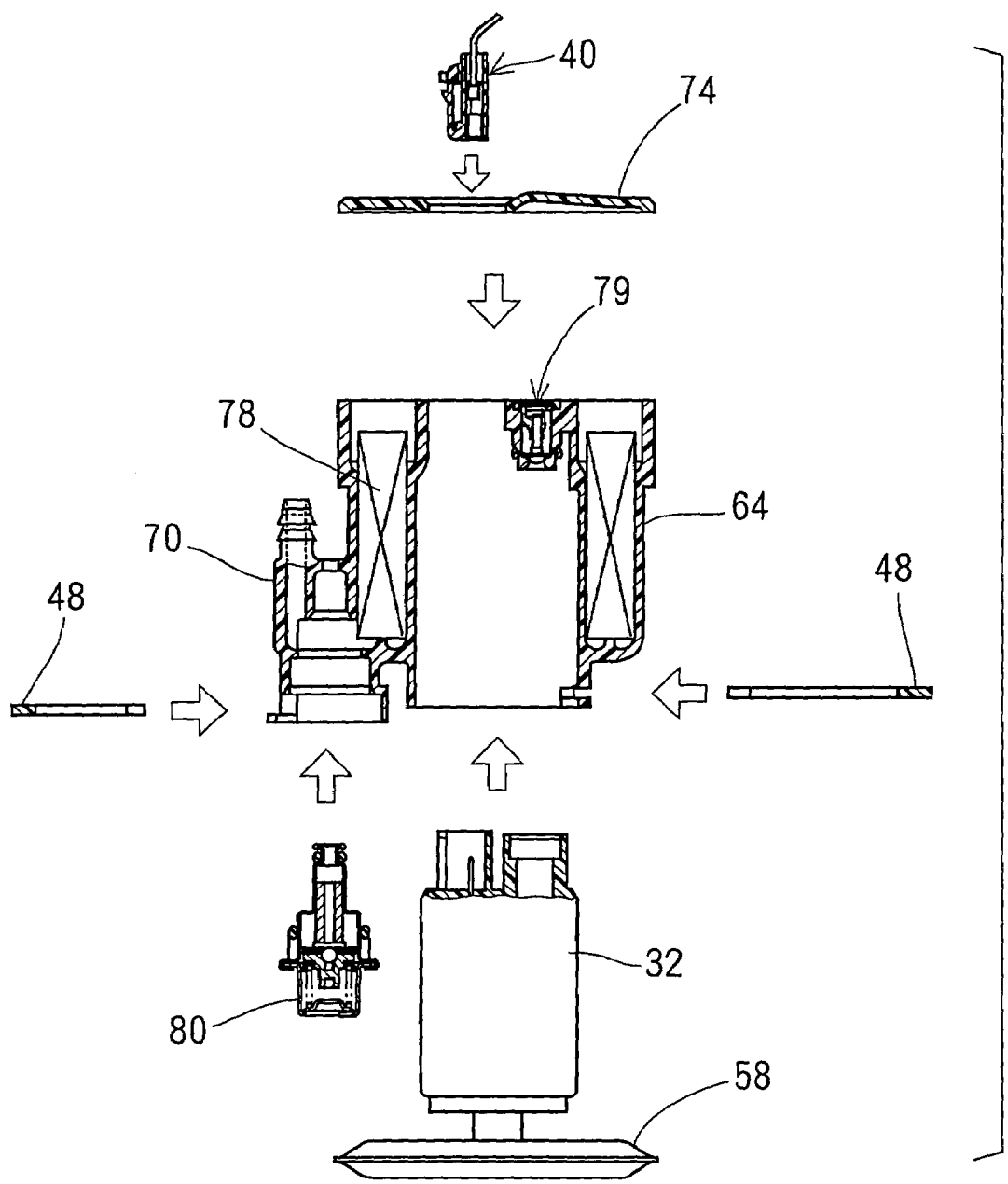
FIG. 6 is a disassembled perspective view showing the pump module according to the first embodiment.

FIG. 6 shows a perspective view showing the pump module 30 in a disassembled condition. It is easy to assemble the pump module 30, since the mounting direction of each part can be used two directions, which are the axial direction and the orthogonal direction that is perpendicular to the center axis.

In the pump module 30, the pressure regulator 80 is disposed on a sidewall of the outer circumference of the filter casing 62. Therefore, a part of the pressure regulator 80 overlaps with the filter casing 62 in the range of the axial direction. An actual length of the fuel filter 60 and the pressure regulator 80 assembled in the pump module 30 in the axial direction is shorter than a total length summed up each length of the fuel filter 60 and the pressure regulator 80 in the axial direction. Therefore, the axial length of the whole pump module 30 in the axial direction is shortened.

A part of the pressure regulator 80 is disposed in a dead space between the outlet portion 71 of the fuel outlet 70 and the outer cylinder 66. The dead space is disposed in the radial direction. Therefore, the length of the pump module 30 in the radial direction is prevented from being enlarged. Further, a part of the pressure regulator 80 is disposed in the projection region of the filter casing 62, which is provided by projecting the filter casing 62 in the axial direction. Therefore, each length of the filter casing 62 and the pressure regulator 80 in the radial direction, which is perpendicular to the center axis, is shortened.

In the pump module 30, the fuel inlet 68 is engaged in the discharge portion 34, and the check valve 79 is disposed in the fuel inlet 68. The discharge portion 34, the fuel inlet 68, and the check valve 79 overlap each other in the range of the axial direction, so that the actual length of the fuel pump 32 in the axial direction is shortened.

Moreover, in the pump module 30, the inner cylinder 65, the outer cylinder 66, and the fuel inlet 68 are integrally made of resin, and the filter casing 62 and the fuel outlet 70 are integrally made of resin. Therefore, the number of the parts is reduced, and the integrated parts and the cover 74 of the filter casing 62 can be welded simultaneously when the fuel filter 60 is assembled. Thus, the assembling step is simplified, and the number of the assembling steps is reduced.

The inner circumferential sidewall 65a of the inner cylinder 65, the top surface 33a of the resin cover 33 of the fuel pump 32, and the inner circumferential sidewall 74a of the cover 74 provide the upper concavity 90, so that the upper concavity 90 has an upper opening, which is disposed on the upside of the upper concavity 90, as shown in FIGS. 1 and 2. Moreover, since the O-ring 38 seals a space between the inner circumferential wall of the discharge portion 34 and the outer circumferential wall of the fuel inlet 68, the fuel does not leak into the power supply passage 400, on which the upper concavity 90 is disposed. Therefore, no sealing between the power supply cable 46 and the power supply passage 400 is necessitated, so that the power supply connector 50 and the receiving connector 40 can be detached easily by utilizing the opening of the upper concavity 90. Moreover, the power supply connector 50 is removed from the receiving connector 40, and the snap ring 48 is removed from the filter casing 62, so that each of the fuel pump 32 and the fuel filter 60 can be changed easily.

In the pump module 30, the check valve 79 is disposed in the fuel inlet 68, and the O-ring 38 seals a space between the outer circumferential wall of the fuel inlet 68 and the inner circumferential wall of the discharge portion 34, which accommodates the fuel inlet 68. Therefore, residual pressure in a passage that is disposed downstream from the fuel inlet 68 can be held sufficiently, even if the fuel leaks through the O-ring 38. Therefore, when the engine of the vehicle starts, the pump module 30 can supply the fuel immediately by utilizing the residual pressure held in the passage.

A part of the pressure regulator 80 is disposed in the notch region 104, which is formed by notching a part of the outer circumference of the suction filter 58. Therefore, the pressure regulator 80 disposed under the filter casing 62 and the suction filter 58 disposed under the fuel pump 32 are not interrupted each other. The pressure regulator 80 is assembled near the center of the pump module 30 without removing the suction filter 58 and the pressure regulator 80 in the axial direction. Therefore, the axial length and the radial length of the pump module 30 are shortened, so that the pump module becomes compact.

The excess fuel is discharged from the pressure regulator 80 to the upper side of. the pressure regulator 80. Therefore, the discharged excess fuel changes its flowing direction, and then flows into the sub-tank 20 with reducing the flowing speed. Accordingly, even when the discharged excess fuel hits the inner wall of the sub-tank 20 and the accumulated fuel in the sub-tank 20, its impact can be reduced, so that a noise in the sub-tank 20 generated by the impact of the discharged excess fuel is reduced.

The pressure regulator 80 can be disposed in reverse, so that the output passage 80 turns downward and the pressure regulator 80 is disposed outside the outer circumference of the body 64.

At least a part of the pressure regulator 80 is disposed in the notch region 104 of the suction filter 58. However, the pressure regulator 80 can approach much near the center of the suction filter 58 so that at least a part of the pressure regulator 80 is disposed in the concavity 59 of the suction filter 58. Moreover, the notch region 104 of the suction filter 58 can be formed into a linear shape or an L-shape.

If the suction filter 58 and the pressure regulator 80 are disposed on the same side of the axial direction, and the suction filter 58 and the pressure regulator 80 overlap each other in the range of the axial direction, the pressure regulator 80 can be disposed outside the outer circumference of the suction filter 58, which has no notch region 104.

In the above pump module 30, the pump module 30 includes the drain passage 402 for draining water from upside to downside through a space between the fuel pump 32 and the filter casing 62 when the pump module 30 is mounted in the vehicle. The drain passage 402 has at least one passage and is disposed between the sidewall of the outer circumference of the fuel pump 32 and the sidewall of the inner circumference of the inner cylinder 65 of the filter casing 62. The above construction is provided for solving the following problems.

To design the filter casing 62 compact, it is preferred that the inner cylinder 65 of the filter casing 62 and the fuel pump 32 contact together. However, when the inner cylinder 62 and the fuel pump 32 contact at the entire circumference, the water may be accumulated between the inner cylinder 65 and the fuel pump 32 in some case where the pump module 30 is mounted. For example, when the fuel pump 32 is mounted in a sub-tank 20 that is equal to and longer than the fuel pump 32, the fuel pump 32 is dipped in the fuel up to the upside of the fuel pump 32. A small amount of water is contained in the fuel. Since the density of the water is larger than that of the fuel, the water is separated from the fuel and sinks downward. Then, the water is accumulated between the inner cylinder 65 of the filter casing 62 and the fuel pump 32. Here, the accumulated water may be sometimes reached upside of the fuel pump 32.

Therefore, the water is not accumulated in the upper concavity 90 disposed between the top surface of the fuel pump 32 and the sidewall of the inner circumference of the inner cylinder 65 of the filter casing 62. Therefore, the parts disposed on the upside of the fuel pump 32 are limited from rusting by the water.

Second, Third and Fourth Embodiments

Figure 7:
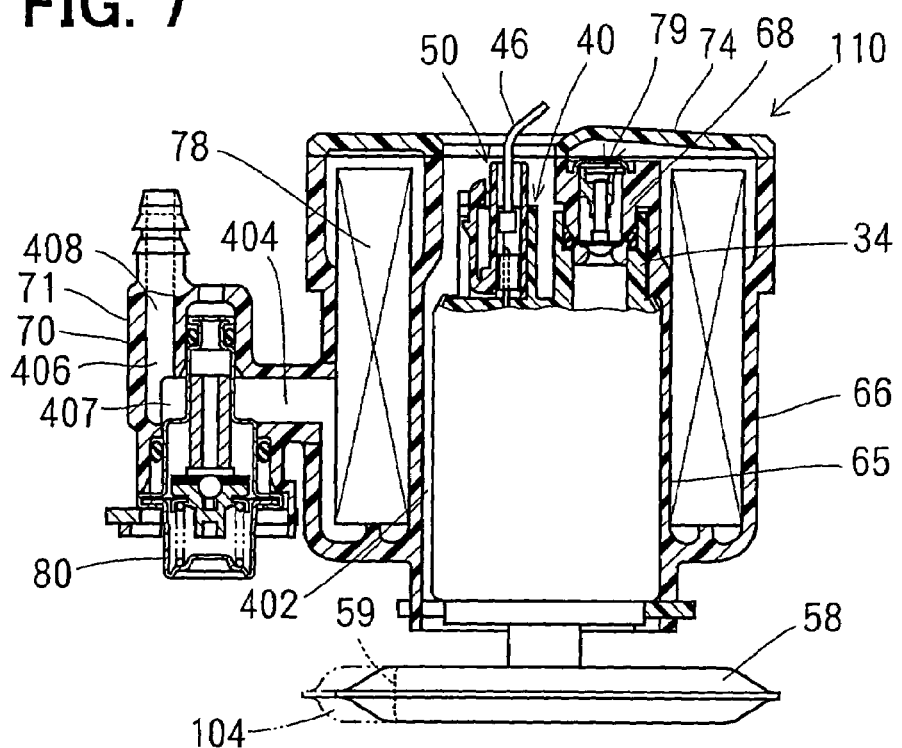
FIG. 7 is a cross-sectional view showing a pump module according to the second embodiment of the present invention.
Figure 8:
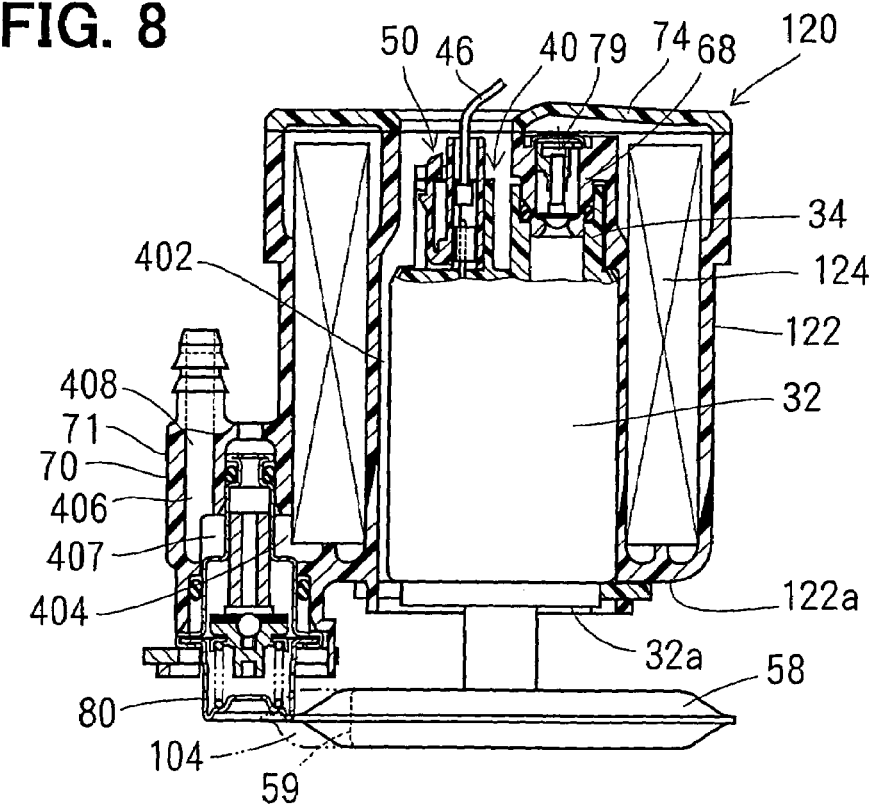
FIG. 8 is a cross-sectional view showing a pump module according to the third embodiment of the present invention.
Figure 9:
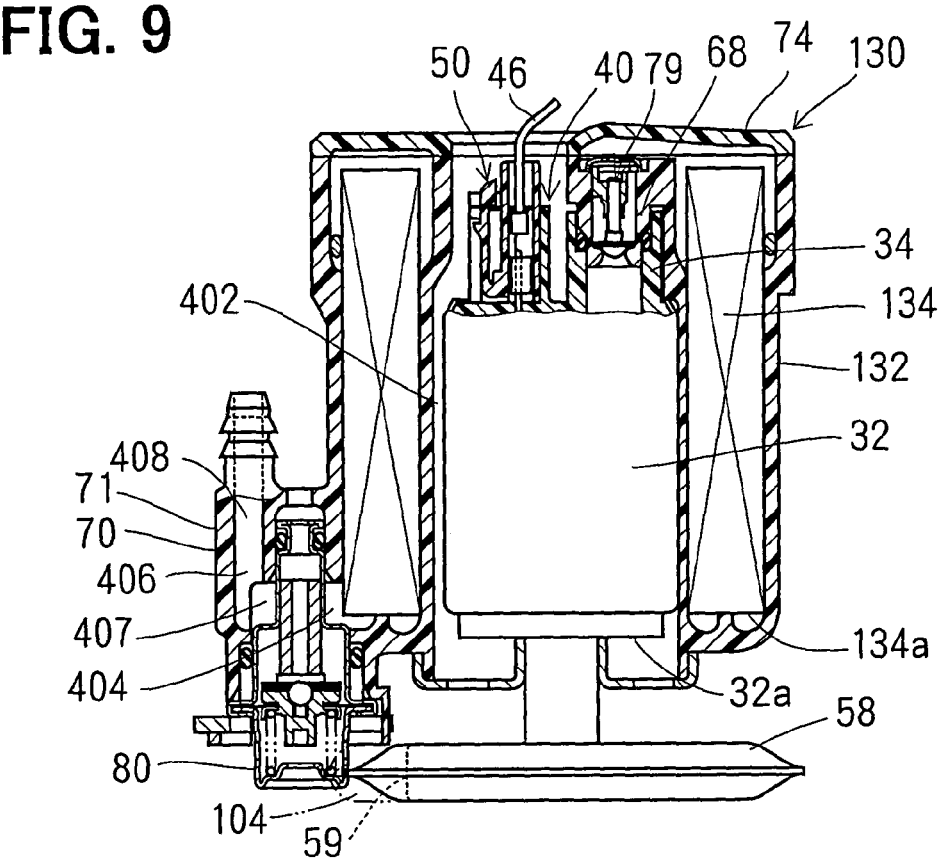
FIG. 9 is a cross-sectional view showing a pump module according to the fourth embodiment of the present invention.

Pump modules according to the second, third and fourth embodiments of the present invention are shown in FIGS. 7-9, respectively.

In a pump module 110 in FIG. 7 according to the second embodiment, the pressure regulator 80 overlaps with the filter casing 62 in the range of the axial direction. The pressure regulator 80 is disposed outside the outer circumference of the body 64, and separates from the sidewall of the outer circumference of the body 64. That is, the pressure regulator 80 does not overlap with the filter casing 62 in a range of the radial direction. Although the pressure regulator 80 and the filter casing 62 are connected with the fuel outlet 70, which is integrated with the body 64, the pressure regulator 80 and the filter casing 62 can be connected with another part, which is not integrated with the body 64.

In a pump module 120 in FIG. 8 according to the third embodiment, a filter casing 122 and a filter element 124 are longer than those of the pump module in FIG. 2 in the axial direction, respectively. A bottom surface 122a of the filter casing 122 and the bottom surface 32a of the fuel pump 32 are almost on the same plane.

In a pump module 130 in FIG. 9 according to the fourth embodiment, a filter casing 132 and a filter element 134 are longer than those of the pump module in FIG. 1 in the axial direction, respectively. A bottom surface 134a of the filter element 134 and the bottom surface 32a of the fuel pump 32 are almost on the same plane.

Fifth Embodiment

Figure 10:
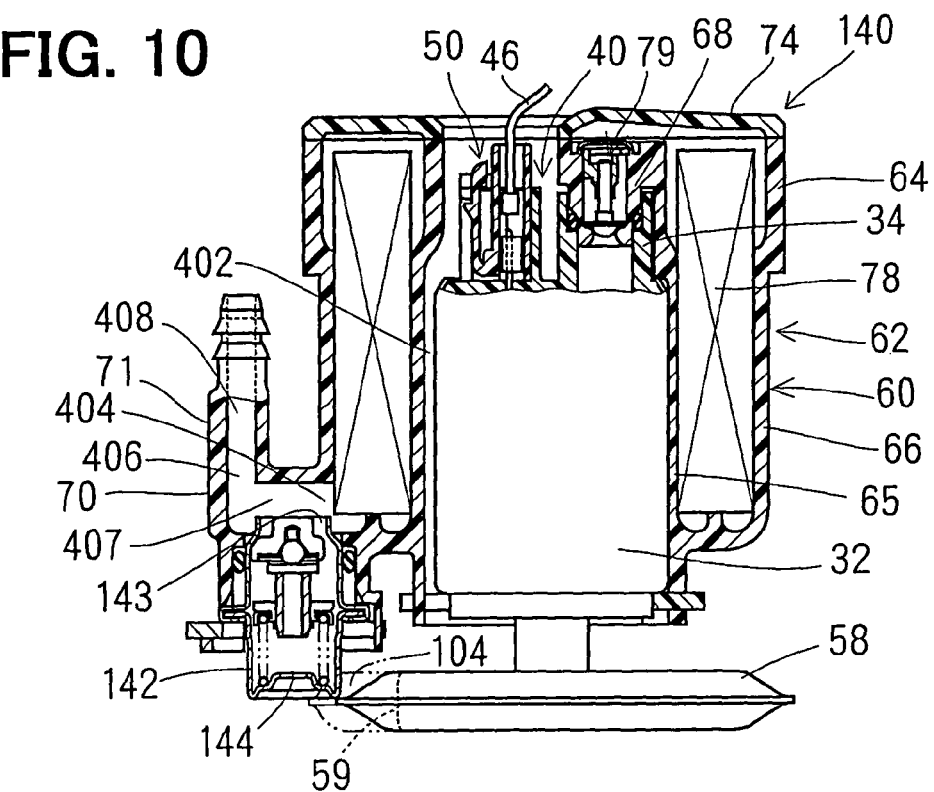
FIG. 10 is a cross-sectional view showing a pump module according to the fifth embodiment of the present invention.

A pump module 140 according to the fifth embodiment of the present invention is shown in FIG. 10.

A pressure regulator 142 of the pump module 140 is disposed outside the outer circumference of the filter casing 62. The flow direction of the fuel flowing from the filter casing 62 into an inlet passage 143 of the pressure regulator 142 is the same direction as the flow direction of the fuel being discharged from an outlet passage 144 of the pressure regulator 142.

Sixth Embodiment

Figure 11:
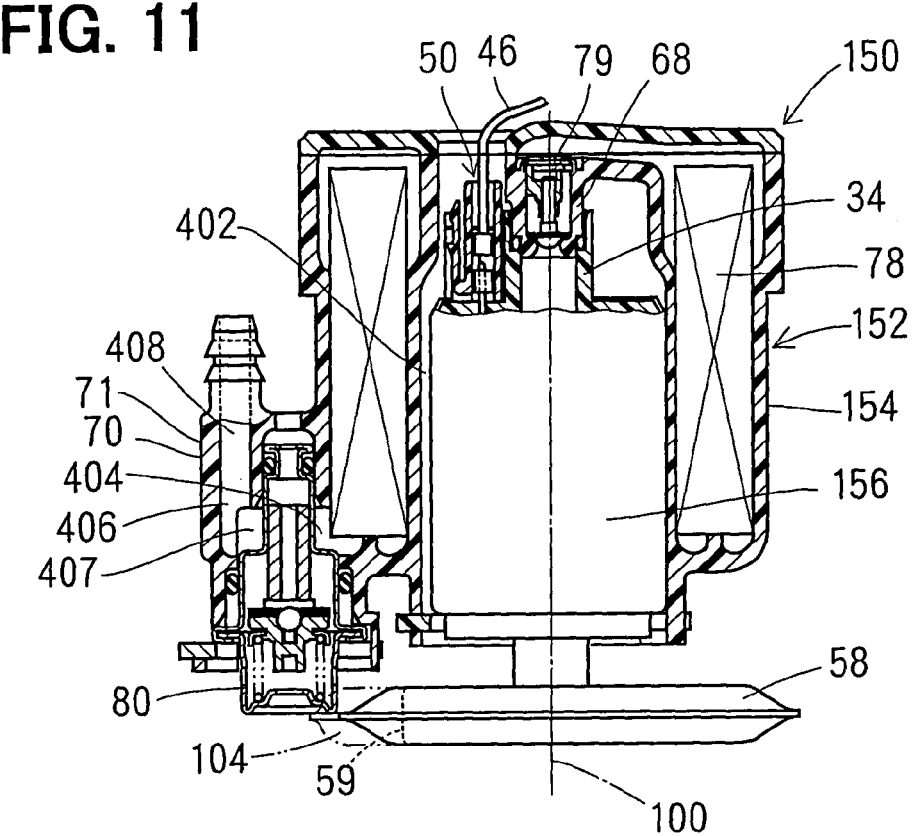
FIG. 11 is a cross-sectional view showing a pump module according to the sixth embodiment of the present invention.

A pump module 150 according to the sixth embodiment of the present invention is shown in FIG. 11.

The discharge portion 34 of a fuel pump 156 in the pump module 150 is disposed almost on the center axis 100 of the fuel pump 156. According to the position of the discharge portion 34, the fuel inlet 68 of the filter casing 154 of the fuel filter 152 is also almost disposed on the center axis 100 of the fuel pump 156. That is, the discharge portion 34 and the fuel inlet 68 are disposed on the center axis of the filter casing 154.

The fuel pump 156 is an electric driving type fuel pump, which sucks the fuel by rotating the rotation part together with the motor, and then discharges the fuel from the discharge portion 34. The fuel flowing through the fuel pump 156 is gathered uniformly at the discharge portion 34, which is disposed on the center axis. Then, the fuel is discharged. Therefore, the flow of the fuel flowing toward the discharge portion 34 in the fuel pump 156 is limited from occurring a turbulent flow, so that the vibration of the fuel pump 156 is reduced.

Seventh Embodiment

Figure 12:
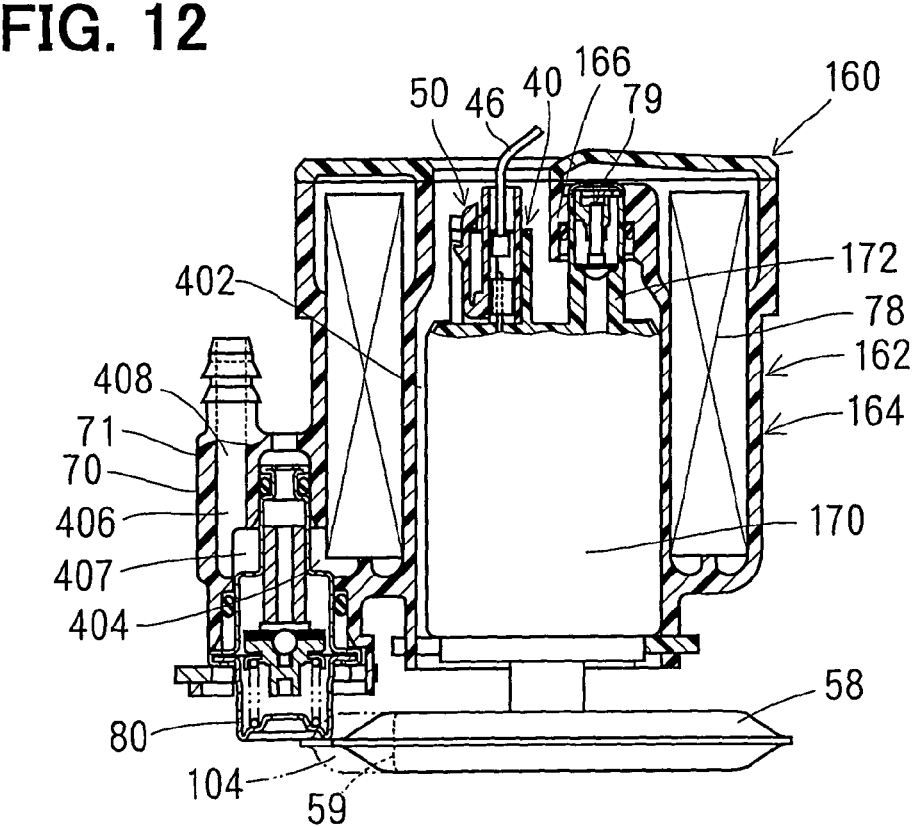
FIG. 12 is a cross-sectional view showing a pump module according to the seventh embodiment of the present invention.

A pump module 160 according to the seventh embodiment of the present invention is shown in FIG. 12.

A discharge portion 172 of a fuel pump 170 in the pump module 160 is engaged to a fuel inlet 166 of the filter casing 164 of the fuel filter 162. The check valve 79 is accommodated in the inner circumference of the discharge portion 172.

The fuel inlet 166 of the filter casing 164, the discharge portion 172 of the fuel pump 170, and the check valve 79 overlap each other in the range of the axial direction. Therefore, the actual length of the fuel inlet 166 of the filter casing 164, the discharge portion 172 of the fuel pump 170, and the check valve 79 assembled in the pump module is shortened to the utmost.

Eighth Embodiment

Figure 13:
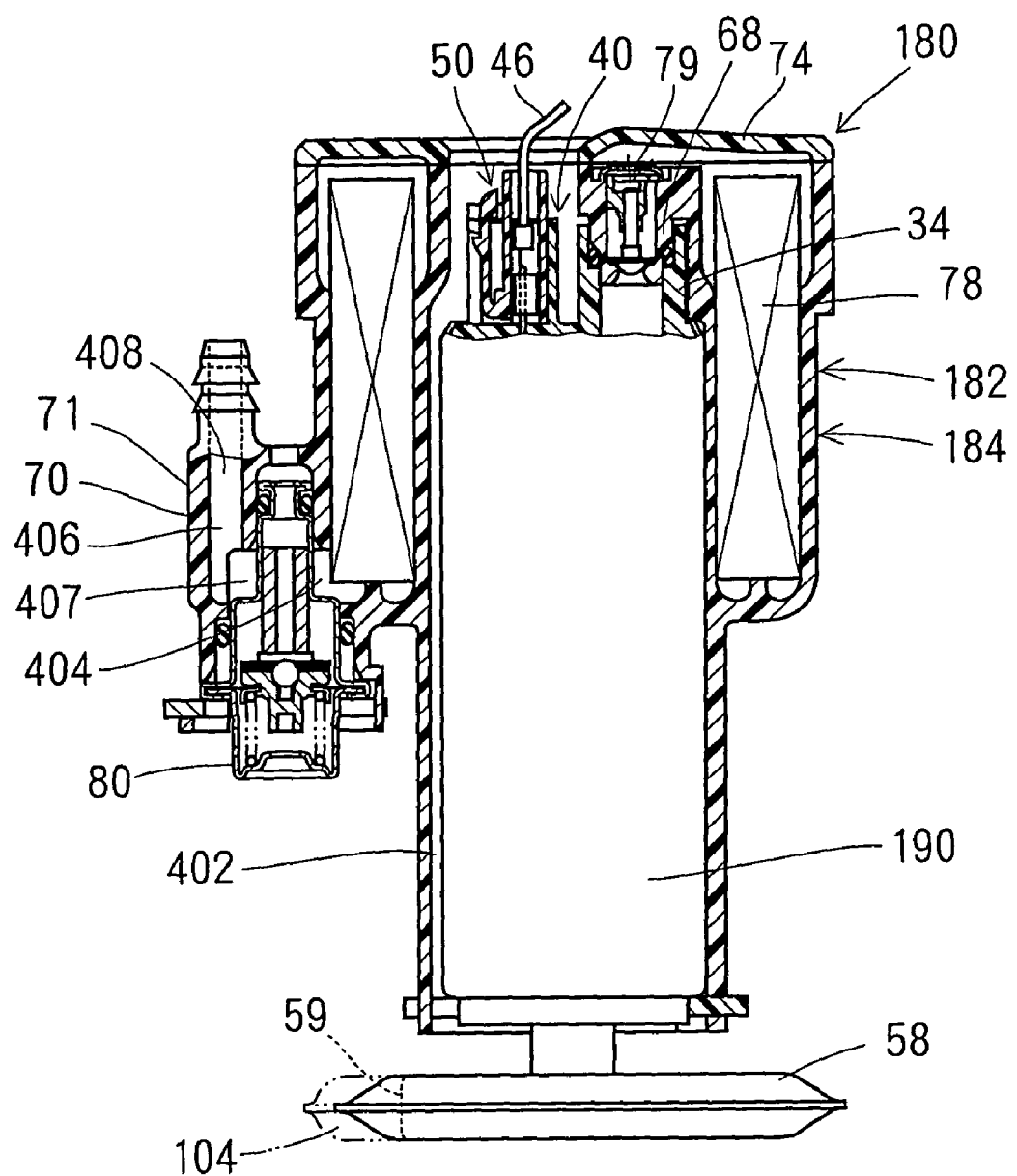
FIG. 13 is a cross-sectional view showing a pump module according to the eighth embodiment of the present invention.

A pump module 180 according to the eighth embodiment of the present invention is shown in FIG. 13.

Comparing to the fuel pumps 32, 156, 170 in FIGS. 1, and 7-12, a fuel pump 190 in the pump module 180 becomes longer in the axial direction. Therefore, the filter casing 184, which covers the entire circumference of the fuel pump 190 also becomes longer in the axial direction. The pressure regulator 80 is disposed on a sidewall of the outer circumference of the filter casing 184.

Ninth Embodiment

A pump module 200 according to the ninth embodiment of the present invention is shown in FIGS. 14-17.

Figure 14:
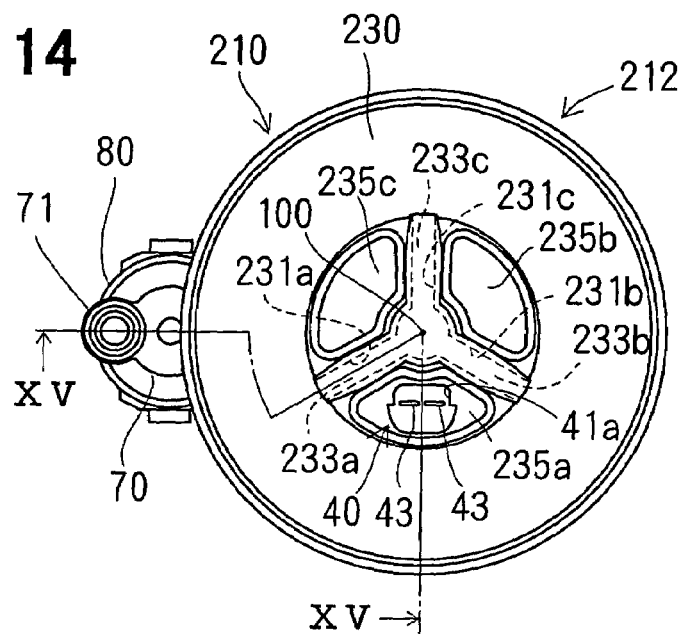
FIG. 14 is a plan view showing the pump module according to the ninth embodiment of the present invention.

The pump module 200, as shown in FIG. 14, is accommodated in the sub-tank 20. The sub-tank 20 is accommodated in the fuel tank 1. The pump module 200 includes the suction filter 58, a fuel pump 202, a fuel filter 210, the pressure regulator 80, and the like.

The fuel pump 202 is fixed to the fuel filter 210 by using a support table 208. The fuel pump 202 includes a motor (not shown) as an electric driving unit. The motor is accommodated in the fuel pump 202 rotatably. The rotation of the motor generates a suction force for sucking the fuel. The top surface 204 of the fuel pump 202 provides a discharge portion 205. The discharge portion 205 is disposed on the center axis 100 of the fuel pump 205.

The electric power for driving the motor is supplied to the fuel pump 202 through the power supply cable 46. Specifically, the receiving connector 40 is disposed on the outer circumference of the discharge portion 205 on the top surface 204. The receiving connector 40 includes a connector housing 41 and the receiving terminal 43. The receiving terminal 43 connects electrically to the motor of the fuel pump 202. The connector concavity 41a has an opening disposed on the top surface 204, and the receiving terminal 43 is extruded from the bottom surface of the connector concavity 41a. The connector concavity 41a is engaged to the power supply connector 50, which includes the power supply terminal 52. The power supply terminal 52 is disposed on one end of the power supply cable 46. The power supply terminal 52 of the power supply cable 50, which is engaged to the connector concavity 41a, contacts the receiving terminal 43, so that the power supply cable 46 and the receiving terminal 43 are electrically connected together.

The fuel filter 210 filters comparatively small contaminants, which are contained in the fuel discharged from the fuel pump 202. The fuel filter 210 includes the fuel outlet 70 made of resin, the filter element 78, a resin filter casing 212, and the like.

The filter casing 212 is fixed to the sub-tank 20 by using the support table 208. The filter casing 212 includes an inner cylinder 213, an outer cylinder 214, a base 215, a jacket 220, and a cover 230. The filter casing 212 and the fuel outlet 70 are integrally made of resin.

The fuel outlet 70 includes the outlet portion 71, and accommodates the pressure regulator 80. The fuel flows from the discharge opening 404 to the fuel outlet 70, the discharge opening 404 being disposed on the downside of the outer cylinder 214. Then, the fuel is regulated at a predetermined pressure by the pressure regulator 80, and flows through the outlet portion 71. The fuel flowing through the outlet portion 71 is discharged from the fuel discharge pipe 12 to the outside of the fuel tank 1 through the bellows 24, which is connected to one end of the outlet portion 71.

The inner cylinder 213 covers the outer circumference of the fuel pump 202. The outer cylinder 214 is formed so as to become larger than the inner cylinder 213, so that the outer cylinder 214 is disposed outside the outer circumference of the inner cylinder 213 and covers the outer circumference of the inner cylinder 213. Each center axis of the inner and outer cylinders 213, 214 coincides with the center axis 100 of the fuel pump 202. Therefore, an accommodation chamber 217 is formed between the inner and outer cylinders 213, 214, and the cross-section of the accommodation chamber 217 is a ring shape. The filter element 78 having a cylindrical shape is accommodated in the accommodation chamber 217. That is, the accommodation chamber 217, the filter element 78, and the discharge portion 205 of the fuel pump 202 are disposed concentrically. Each downside open end of the inner and outer cylinders 213, 214 connects to a base 215 having a ring shape. The base 215 of the filter casing 212 covers the downside of the accommodation chamber 217. The base 215 of the filter casing 212 is integrated with the inner and outer cylinders 213, 214.

The jacket 220 is connected to the upper open periphery 213a of the inner cylinder 213, and covers the top surface 204 of the fuel pump 202. The jacket 220 is integrally formed with the inner and outer cylinders 213, 214. The cover 230 of the filter casing 212 is connected to both the upper open periphery 214a of the outer cylinder 214 and the upper wall of the jacket 220, which is opposite to the fuel pump, so that the cover 230 covers the upper periphery of the accommodation chamber 217. The cover 230 is welded and fixed to the outer cylinder 214 and the jacket 220. Both the jacket 220 and the cover 230 provide a fuel passage 232. The fuel passage 232 includes an upper passage 218a and three lower passages 233a-233c. The fuel passage 232 connects to the discharge portion 205 of the fuel pump 202 and the upper periphery of the accommodation chamber 217, so that the fuel discharged from the fuel pump 202 flows from the discharge portion 205 to the accommodation chamber 217. In this embodiment, both the jacket 220 and the cover 230 constitutes a covert, the jacket 220 constitutes the first division portion of the covert, and the cover 230 constitutes the second division portion of the covert.

Specifically, a fuel inlet 218 is formed in the jacket 220. The fuel inlet 218 has a cylindrical shape and is engaged to the inner circumferential side of the discharge portion 205. The fuel inlet 218 is engaged to the discharge portion 205 concentrically. An upper passage 218a formed in the fuel inlet 218 and a passage formed in the discharge portion 205 are connected each other, so that the fuel discharged from the fuel pump 202 flows into the upper passage 218a. The upper passage 218a is disposed upstream from the fuel passage 232. The O-ring 38 is inserted between the sidewall of the outer circumference of the fuel inlet 218 and the inner circumferential sidewall of the discharge portion 205, so that the O-ring 38 prevents the fuel from leaking through the engaging portion between the fuel inlet 218 and the discharge portion 205. The check valve 79 is disposed in the upper passage 218a. The check valve 79 prevents the fuel from flowing back to the discharge portion 205.

Figure 16:
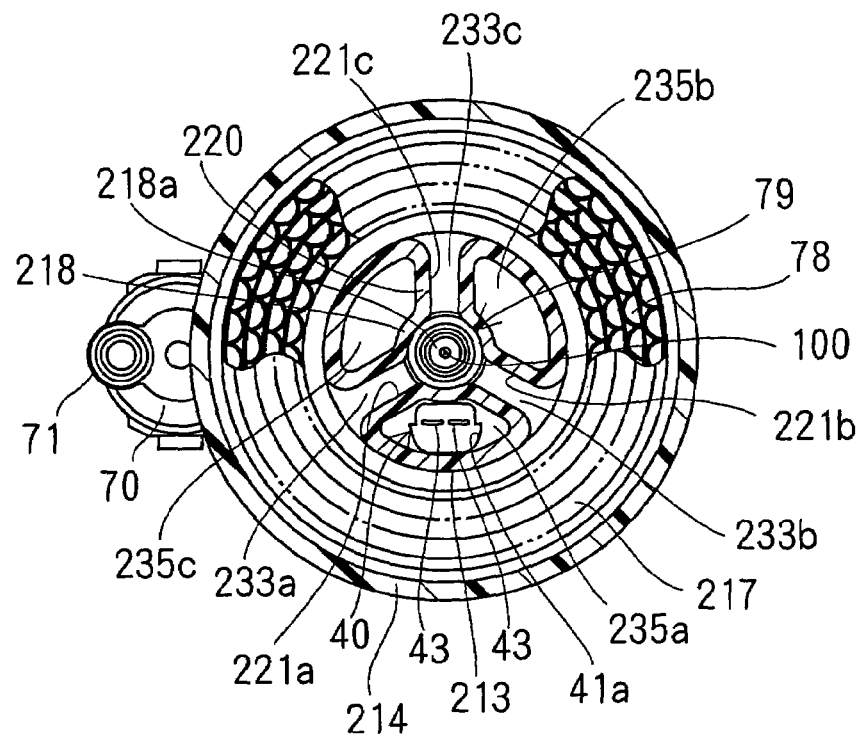
FIG. 16 is a cross-sectional view showing the pump module taken along line XVI-XVI in FIG. 15, according to the ninth embodiment.
Figure 17:
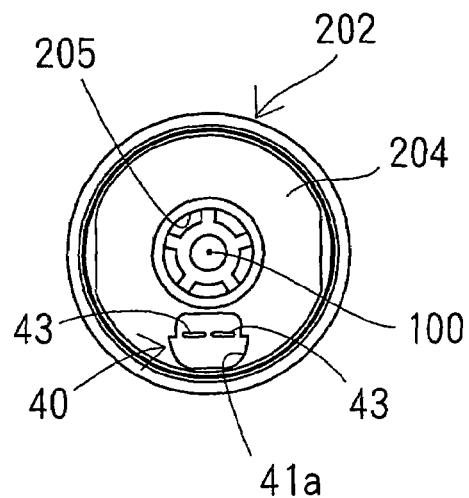
FIG. 17 is a plan view showing a fuel pump of the pump module according to the ninth embodiment.

As shown in FIG. 16, three lower passage grooves 221a-221c are formed in the upper wall of the jacket 220. Each lower passage groove 221a-221c has an opening on the upper wall of the jacket 220. Each lower passage groove 221a-221c radially extends from the center axis 100 to the circumference of the accommodation chamber 217 toward a certain point, each of which is disposed at even intervals. Here, the discharge portion 205 of the fuel pump 202 is disposed on the center axis 100. Each one end of the lower passage grooves 221a-221c disposed on the center axis 100 side connects to the upper periphery of the inner circumferential sidewall of the fuel inlet 218. Each of the other ends of the lower passage grooves 221a-221c disposed on the accommodation chamber 217 side connects to the upper open periphery 213a of the inner cylinder 213.

Figure 15:
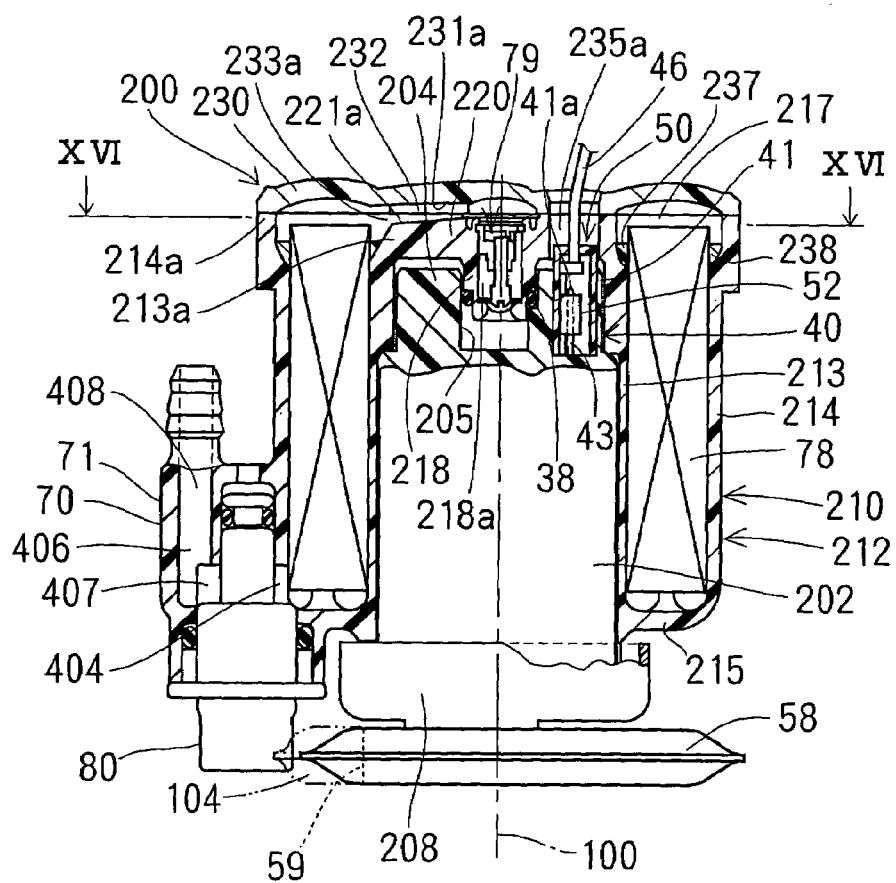
FIG. 15 is across-sectional view showing the pump module taken along line XV-XV in FIG. 14, according to the ninth embodiment.

As shown in FIG. 15, the inner top surface of the cover 230 disposed on the jacket 220 side has three upper passage grooves 231a-231c. Each upper passage groove 231a-231c has an opening on the inner top surface of the cover 230. The upper passage grooves 231a-231c face the lower passage grooves 231a-231c, respectively, and extend radially from the center to the outside. The upper passage groove 231a and the lower passage groove 221a provide a lower passage 233a, the upper passage groove 231b and the lower passage groove 221b provide a lower passage 233b, and the upper passage groove 231c and the lower passage groove 221c provide a lower passage 233c, respectively. Thus, each lower passage 233a-233c formed between the jacket 220 and the cover 230 connects to the upper passage 218a at one end of each lower passage 233a-233c disposed on the center axis 100 side. Each lower passage 233a-233c connects to the upper periphery of the accommodation chamber 217 disposed on the accommodation chamber 217 side. Thus, the fuel flows into the upper passage 218a, and then flows from the center 100 side of the discharge portion 205 to the three circumferential points of the accommodation chamber 217 through three lower passages 233a-233c. The lower passages 233a-233c are disposed downstream from the fuel passage 232.

Three through holes 235a-235c are formed in both the jacket 220 and the cover 230, as shown in FIGS. 15 and 16. Each through hole 235a-235c penetrates through both the jacket 220 and the cover 230. The through hole 235a is disposed between the lower passage 233a and the lower passage 233b and extends along with the vertical direction, which is parallel to the center axis 100 of the fuel pump 202, the through hole 235b is disposed between the lower passage 233b and the lower passage 233c, and the through hole 235c is disposed between the lower passage 233c and the lower passage 233a, respectively. Therefore, each through hole 235a-235c does not connect to the fuel passage 232, which is provided by the upper passage 218a and the lower passages 233a-233c. The through hole 235a is disposed on the upside of the receiving connector 40 of the top surface 204. The receiving terminal 43 is exposed by using the through hole 235a when the power supply cable 46 is removed, as shown in FIG. 15. As shown in FIG. 14, when the receiving connector 50 is engaged to the connector concavity 41a so that the power supply cable 46 is attached, one end of the power supply cable 46 disposed on the power supply connector 50 side (i.e., the power supply terminal 52 side) is inserted into the through hole 235a. The through hole 235a constitutes a power supply passage.

As shown in FIG. 16, the filter element 78 flows the fuel, which is flown into the upper periphery of the accommodation chamber 217 through the fuel passage 232, toward the downside of the vertical direction, which is parallel to the center axis of the accommodation chamber 217 (i.e., the center axis 100 of the fuel pump 202). Thus, the filter element 78 eliminates contaminants by filtering the fuel. The first sealing 237 seals between the filter element 78 and the inner cylinder 213, and the second sealing 238 seals between the filter element 78 and the outer cylinder 214.

Next, the operation of the pump module 200 is described as follows.

When an engine of the vehicle starts, the power supply cable 46 supplies electric power to the fuel pump 202. Then, the fuel pump 202 sucks and pressurizes the fuel in the sub-tank 20 through the suction filter 58, and discharges the fuel from the discharge portion 205. In this case, since the discharge portion 205 is disposed on the center axis 100 of the fuel pump 202, turbulence of the fuel flow in the fuel pump 202 is limited from occurring. Thus, the vibration (i.e., pulsation) of the fuel pump 202 becomes comparatively small.

The fuel is discharged from the fuel pump 202, and then flows into the accommodation chamber 217 through the fuel passage 232. Then, the fuel flows through the filter element 78 from the upside to the downside of the filter element 78 so that the fuel is filtered. In this case, the lower passages 233a-233c of the fuel passage 232 provide the fuel flow flowing from the center of the discharge portion 205 to the three circumferential positions disposed on the circumference of the accommodation chamber 217. Three lower passages 233a-233c, which provide the fuel flow flowing towards three directions, have the same length, so that each flow velocity of the fuel flowing into the filter element 78 is the same. Therefore, the vibration (i.e., pulsation) of the filter element 78 is reduced.

After the fuel passes through the filter element 78, the fuel is regulated by the pressure regulator 80. Then, the fuel is supplied to the engine, which is disposed outside the fuel tank 1, through the fuel discharge pipe 12.

In the pump module 200, the O-ring 38 seals between the outer circumferential wall of the fuel inlet 218 and the inner circumferential wall of the discharge portion 205. That is, the O-ring 38 seals the connection portion between the upper passage 218a of the fuel passage 232 and the passage in the discharge portion 205. Therefore, the fuel does not leak to the through hole 235a side. Thus, no sealing is necessitated between the power supply cable 46 and the circumferential wall of the through hole 235a. Moreover, by engaging the power supply connector 50 of the power supply cable 46 to the connector concavity 41a of the receiving connector 40, the power supply terminal 52 of the power supply cable 46 and the receiving terminal 43 of the fuel pump 202 is detachable. Thus, the power supply cable 46 is detached easily if the fuel pump 202 is broken, so that the maintenance of the pump module is easily performed.

Moreover, the check valve 79 is accommodated in the upper passage 218a, and the O-ring 38 seals the connection portion between the upper passage 218a and the discharge portion 205 at a position, which is disposed outside the upper passage 218a. Therefore, even if the fuel leaks through the O-ring 38, the residual pressure in a passage disposed downstream from the upper passage 218a can be secured sufficiently. Therefore, when the engine starts, the pump module 200 supplies the fuel immediately by using the residual pressure. Moreover, the fuel inlet 218 is engaged in the discharge portion 205, and the check valve 79 is accommodated in the fuel inlet 218. Therefore, the whole length of the fuel pump 202 in the axial direction is reduced.

Further, the inner cylinder 213, the outer cylinder 214, the bottom surface of the filter casing 212, and the jacket 220 are integrally made of resin. The filter casing 212 and the fuel inlet 70 are integrally made of resin. The cover 230 is welded to both the upper open periphery 214a of the outer cylinder 214 and one end of the jacket 220, which is opposite to the upper periphery of the fuel pump 202. Therefore, when the filter casing 212 is assembled, the cover 230 of the filter casing 212 can be welded simultaneously with both the integrated outer cylinder 214 and the jacket 220. The assembling step becomes simple, so that the number of the assembling step is reduced.

Tenth Embodiment

Figure 18:
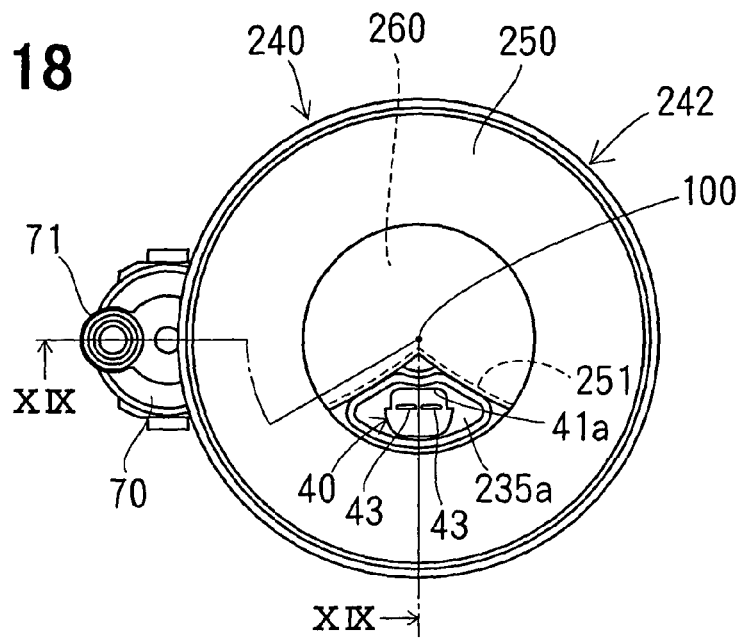
FIG. 18 is a plan view showing the pump module according to the tenth embodiment of the present invention.
Figure 19:
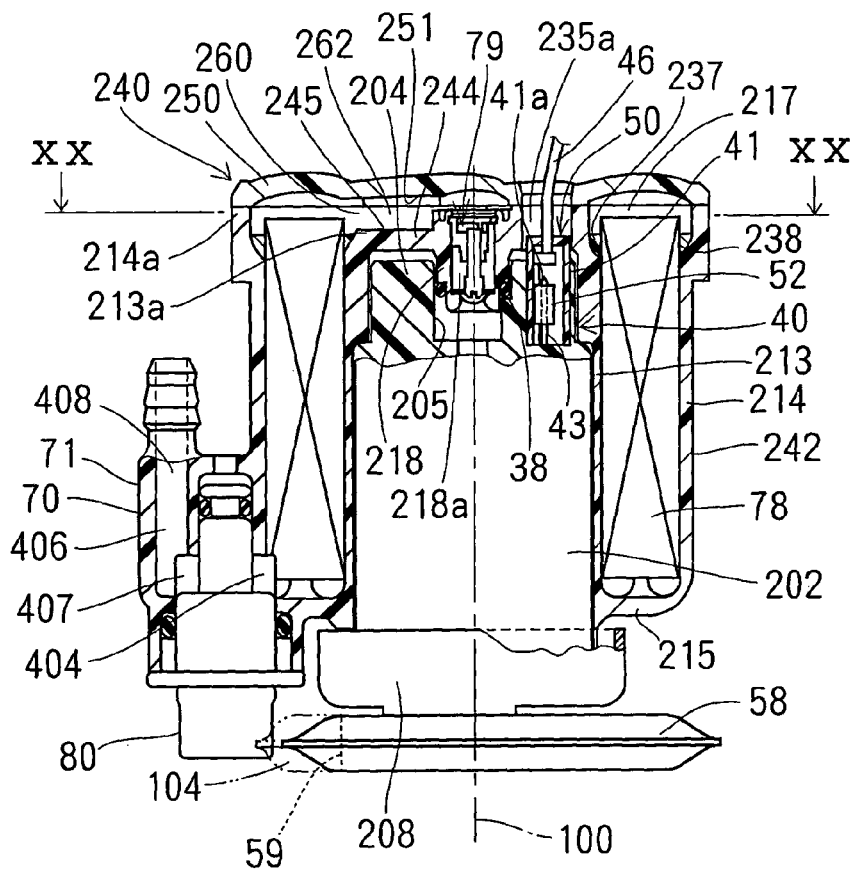
FIG. 19 is a cross-sectional view showing a pump module taken along line XIX-XIX in FIG. 18, according to the tenth embodiment.
Figure 20:
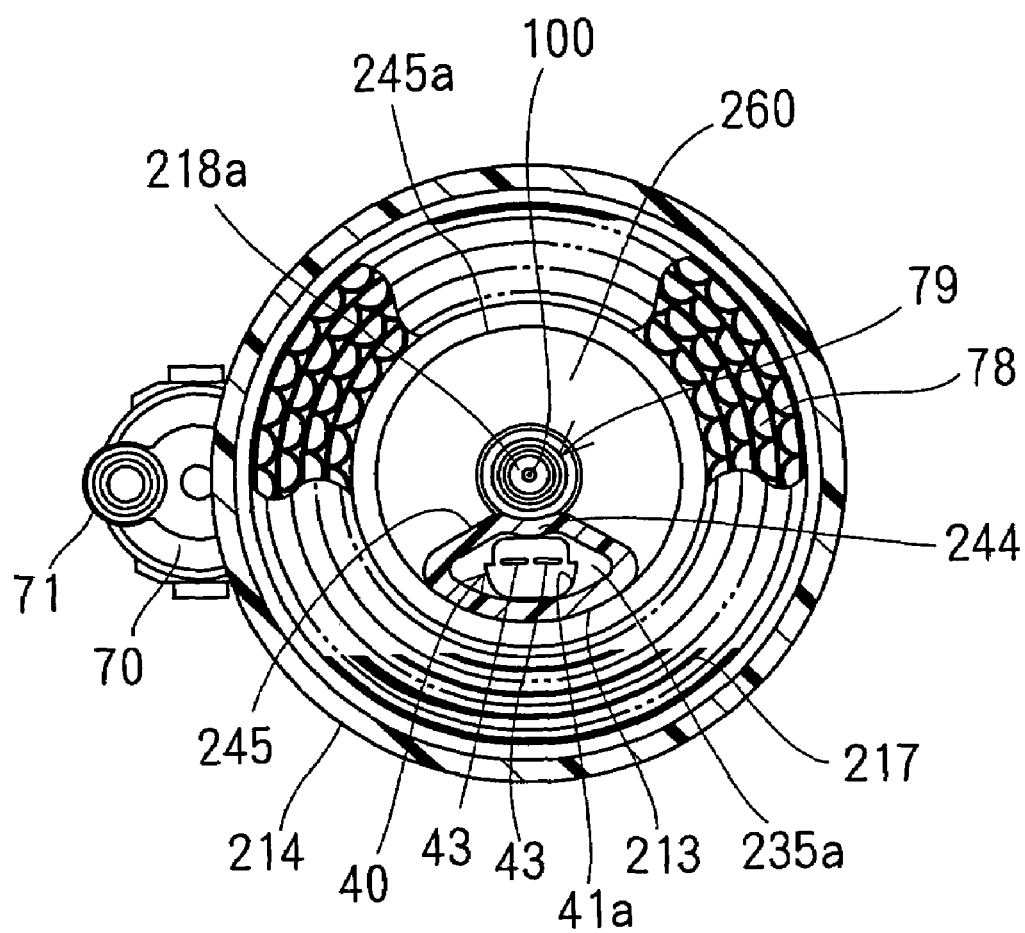
FIG. 20 is a cross-sectional view showing the pump module taken along line XX-XX in FIG. 19, according to the tenth embodiment.

A pump module 240 according to the tenth embodiment of the present invention is shown in FIGS. 18-20.

In the pump module 240, a lower passage 260 having a fan-shape cross-section is formed between a jacket 244 of a filter casing 242 and a cover 250 of the filter casing 242, as shown in FIGS. 19 and 20. The lower passage 260 is substituted for three lower passages 233a-233c of the pump module 200 in FIG. 14. The upper passage 218a and the lower passage 260 provide a fuel passage 262. The fuel passage 262 is a passage for flowing the fuel from the discharge portion 205 to the accommodation chamber 217.

Specifically, the upper wall of the jacket 244 is caved so that the lower passage concavity 245 is formed. The lower passage concavity 245 is caved in such a manner that the center of the lower passage concavity 245 is on the center axis 100 of the fuel pump 202. Here, the discharge portion 205 is disposed on the center axis 100. The lower passage concavity 245 has an almost fan-shape cross-section. The center of the lower passage concavity 245, which is near the center axis 100, connects to the upper periphery of the inner circumferential wall of the fuel inlet 218. An arc portion 245a of the lower passage concavity 245, which is near the accommodation chamber 217, connects to the upper open periphery 213a of the inner cylinder 213. The inner top surface of the cover 250 is caved so that an upper passage concavity 251 is formed. The upper passage concavity 251 faces the lower passage concavity 245, and has a fan-shape cross-section, which is similar to the lower passage concavity 245. A lower passage 260 is formed by sandwiching the upper and lower passage concavities. The lower passage 260 is disposed between the jacket 244 and the cover 250, and connects to the upper passage 218a near the center axis 100. The lower passage 260 connects to the upper periphery of the accommodation chamber 217 at the periphery of the accommodation chamber 217. The fuel flows from the upper passage 218a to the center of the discharge portion 205, and then flows toward a plurality of predetermined points, which is disposed outside the outer circumference of the arc portion 245a of the lower passage concavity 245. Here, the arc portion 245a defines the fan-shape cross-section of the lower passage 260. Then, the fuel flows toward the accommodation chamber 217. That is, the lower passage 260 is disposed downstream from the fuel passage 262. In this embodiment, the arc portion 245a, which defines the fan-shape cross-section, is a major arc, and provides the fuel passage for flowing the fuel in a wide range.

In this pump module 240, the fuel flow provided by the lower passage 260 of the fuel passage 262, i.e., the fuel flow for flowing from the center axis 100 of the discharge portion 205 to a plurality of predetermined points disposed outside the outer circumference of the arc portion 245a has the same passage length at a circumference of the accommodation chamber 217. Therefore, the flow velocity of the fuel flowing into the filter element 78 becomes uniform, so that the vibration (i.e., pulsation) of the filter element 78 is reduced.

The lower passage 260 of the fuel passage 262 is not separated, that is different from the lower passages 233a-233c in FIG. 14. Therefore, the pump module 240 has only one through hole 235a, which provides the power supply passage. Here, the pump module 200 in FIG. 14 has three through holes 235a-235c. The through hole 235a of the pump module 240 extends to the vertical direction, which is parallel to the center axis 100 of the fuel pump 202. The through hole 235a penetrates through both the jacket 244 and the cover 250 at a position where the lower passage concavity 245 and the upper passage concavity 251 are not formed. Thus, the through hole 235a does not connect to the fuel passage 262 that is composed of the upper passage 218a and the lower passage 260. In this embodiment, no sealing between the power supply cable 46 and the inner circumferential wall of the through hole 235a is necessitated. Even when the fuel pump 202 is broken, the power supply cable 46 can be removed easily. Thus, the maintainability of the pump module 240 is promoted.

Specifically, the promotion of the maintainability solves the following problems.

In the pump module according to the related art, the fuel passage, which introduces the fuel from the fuel pump into the filter element, is disposed between the periphery side of the discharge portion of the fuel pump and the cover connected to the open end of the outer cylinder of the filter casing. Moreover, in the pump module according to the related art, an electric driving type fuel pump is used as the fuel pump, so that a power supply cable for supplying electric power to the fuel pump penetrates through the cover. Therefore, a sealing between the cover and the power supply cable is necessitated. Thus, when the fuel pump is broken, it is difficult to detach the power supply cable. Therefore, the maintenance of the pump module is performed with difficulty.

However, in the above pump modules 200, 240 according to the ninth and tenth embodiments, no sealing is necessitated for sealing between the power supply cable 46 and the sidewall of the power supply passage, i.e., the inner circumferential wall of the through hole 235a. Therefore, the power supply terminal 52 of the power supply cable 46 and the receiving terminal 43 of the fuel pump 202 can be detached easily. Thus, if the fuel pump 202 is broken, it is easy to detach the cable. Therefore, the maintenance of the pump module 200, 240 is performed easily.

In the pump modules 200, 240, three lower passages 233a-233c radially branching three directions or the only one lower passage 260, the center of which is on the center axis 100 of the discharge portion 205, provide a plurality of fuel flows. The fuel flows from the center axis 100 of the discharge portion 205 toward a plurality of predetermined points disposed on the circumference of the accommodation chamber 217. However, the above plurality of fuel flows can be provided by a passage that is separated radially into, for example, two or four passages, and by a plurality of passages having a fan-shape cross-section that has a center axis parallel to the center axis of the discharge portion 205.

In the pump modules 200, 240, the discharge portion 205 of the fuel pump 202 is disposed on the center axis 100 of the fuel pump 202. The discharge portion 205 is disposed concentrically with the accommodation chamber 217. However, the discharge portion 205 can be disposed eccentrically with the center axis 100 of the fuel pump. Moreover, the discharge portion 205 can be disposed eccentrically with the center axis of the accommodation chamber 217.

Further, although the housing is composed of the jacket 220, 244 as the first division portion and the cover 230, 250 as the second division portion in the pump modules 200, 240, the housing can be composed of one part or a plurality of parts having more than two parts.

In the pump modules 200, 240, the sealing portion for sealing the connection portion between the upper passage 218a and the discharge portion 205 is disposed outside the upper passage 218a. The check valve 79, which prevents the fuel from flowing back to the discharge portion 205, is disposed in the upper passage 218a. However, the check valve 79 can be disposed in the fuel pump, which is disposed upstream from the discharge portion 205.

Eleventh Embodiment

Figure 21:
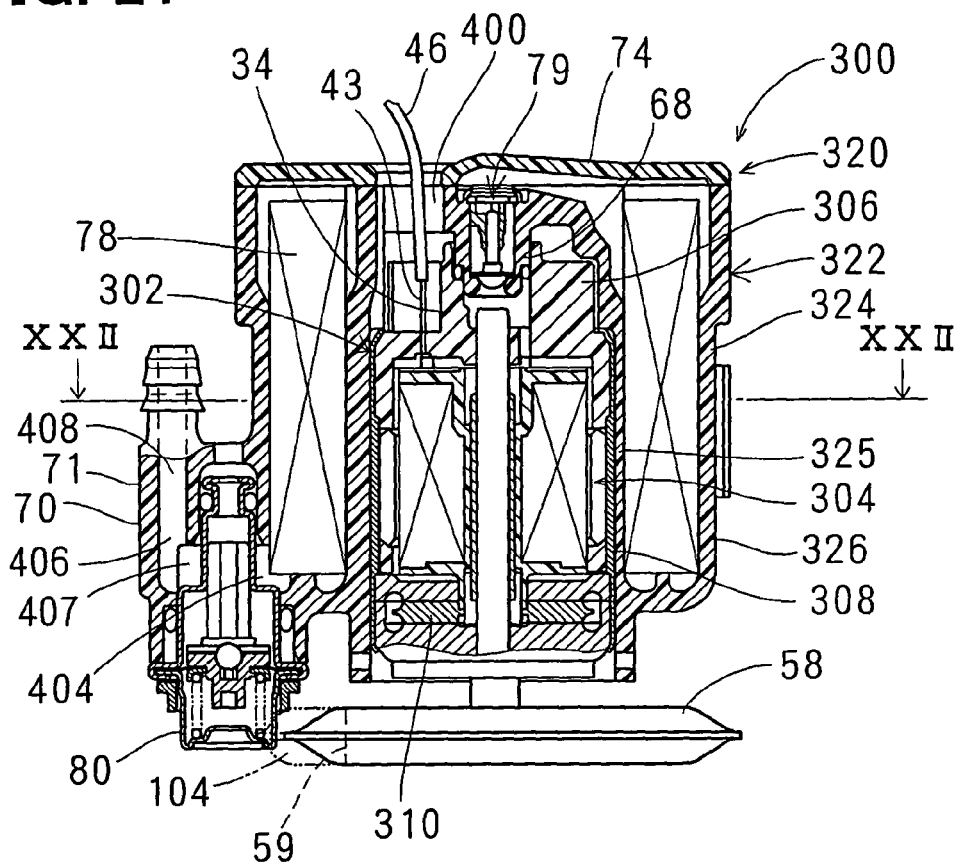
FIG. 21 is a cross-sectional view showing a pump module according to the eleventh embodiment of the present invention.

A pump module 300 according to the eleventh embodiment of the present invention is shown in FIG. 21.

The pump module 300 is accommodated in the sub-tank 20. The sub-tank 20 is accommodated in the fuel tank 1 mounted on the vehicle. The pump module 300 includes the suction filter 58, a fuel pump 302, a fuel filter 320, the pressure regulator 80, and the like.

The fuel pump 302 of the pump module 300 includes a motor 304, which is disposed in the fuel pump 302. The motor 304 generates the suction force for sucking the fuel by rotation of the motor 304. The upside of the fuel pump 302 is covered with a resin cover 306. The motor 304 is accommodated in a pump housing 308, which is made of metal, and is disposed on the outer circumference of the fuel pump 302. The resin cover 306 is clamped and fixed to the pump housing 308. The fuel pump 302 sucks the fuel flown from the suction filter 58, and an impeller 310 pressurizes the fuel. Then the fuel is discharged from the discharge portion 34.

The fuel filter 320 includes a filter casing 322 and the filter element 78. The filter element 78 is accommodated in the filter casing 322. The filter casing 322 includes a body 324 and the cover 74, and has a cylindrical shape. The body 324 includes an inner cylinder 325 and an outer cylinder 326. The inner cylinder 325 covers the outer circumference of the pump housing 308 of the fuel pump 302. The outer cylinder 326 covers the outer circumference of the inner cylinder 325, and is disposed outside of the inner cylinder 325. A distance between the inner circumferential sidewall 325a of the inner cylinder 325 and the outer circumferential sidewall 308a of the pump housing 308 is smaller than a predetermined distance. The fuel filter 320 covers more than 50 percents of the outer circumference of the pump housing of the fuel pump 302 in the circumferential direction. The inner cylinder 325 and the outer cylinder 326 of the body 324 have different thickness, i.e., different radial length. The inner cylinder 325 of the body 324 is thinner than the outer cylinder 326. Therefore, by the fuel pressure in the body 324, the thin inner cylinder 325 deforms larger than the thick outer cylinder 326. As a result, the inner cylinder 325 deforms toward the pump housing 308 side of the fuel pump 302, which is the inner side of the fuel pump 302 in the radial direction.

The upside of the body 324 is sealed with the cover 74 by covering the inner and outer cylinders 325, 326. The fuel inlet 68 of the body 324 is engaged to the inner circumference of the discharge portion 34 of the fuel pump 302. The fuel passes through the filter element 78 so that contaminants are eliminated. Then, the fuel pressure is regulated by the pressure regulator 80, and flows from the fuel outlet 70.

Next, the filter casing 322 of the fuel filter 320 is described in detail as follows.

The filter casing 322 is composed of the body 324 and the cover 74, and they are made of polyacetal resin such as polyoxymethylene (i.e., POM). The POM resin is non-conductive resin, and the volume resistivity of the POM resin is about $10^{14}$ Ωcm. This resistivity is very large, in comparison with the volume resistivity of a conductive resin, i.e., $10^{12}$ Ωcm. The conductive resin is formed by adding and dissipating carbon into the resin. Here, the volume resistivity shows an indicator of resistance for preventing electric charge from moving in the resin. As the volume resistivity becomes large, the electric charge in the resin is limited from moving.

Figure 22:
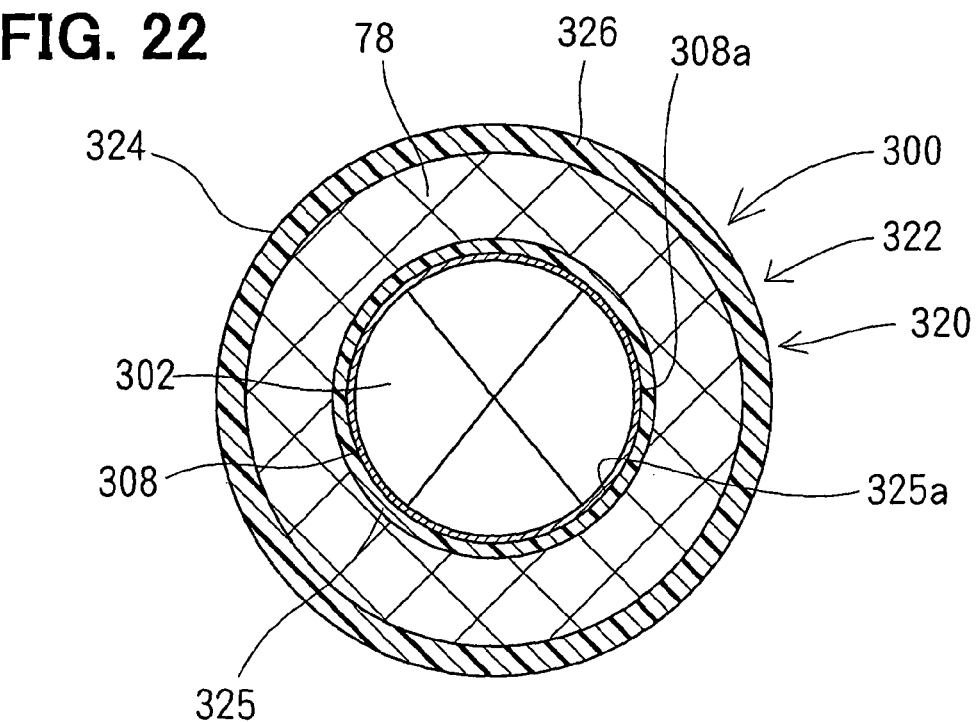
FIG. 22 is a cross-sectional view showing the pump module taken along line XXII-XXII in FIG. 21, according to the eleventh embodiment.

The distance between the inner circumferential sidewall 325a of the inner cylinder 325 of the body 324 and the outer circumferential sidewall 308a of the pump housing 308 of the fuel pump 302 is smaller than a predetermined distance, e.g., smaller than 1 mm. In this embodiment, the inner circumferential sidewall 325a and the outer circumferential sidewall 308a contact together, so that the distance between the inner circumferential sidewall 325a and the outer circumferential sidewall 308a is substantially zero. As shown in FIG. 22, the inner cylinder 325 of the fuel filter 320 covers 100 percents of the outer circumference of the pump housing 308 of the fuel pump 302, i.e., the entire circumference in the circumferential direction is covered. The reason why the distance between the circumferential sidewall 325a and the outer circumferential sidewall 308a becomes smaller than 1 mm, and why the inner cylinder 325 covers more than 50 percents of the outer circumference of the pump housing 308 of the fuel pump 302 is described as follows.

When the fuel passes through the filter element 78 accommodated in the filter casing 322, the fuel is rubbed with the filter element 78, so that static electricity is generated. The generated static electricity may damage the resin parts. Therefore, it is preferred that the static electricity is discharged immediately. In this embodiment, the distance between the inner circumferential sidewall 325a and the outer circumferential sidewall 308a becomes smaller than 1 mm, and the inner cylinder 325 covers more than 50 percents of the outer circumference of the pump housing 308 of the fuel pump 302, so that the charged voltage of the filter casing 322 becomes below 2 kV.

Although the volume resistivity of the POM resin is large, i.e., the electric charge is $10^{14}$ $\Omega$cm, the electric charge charged on the POM resin can move slightly. Therefore, the distance between the inner circumferential sidewall 325a of the inner cylinder 325 of the body 324, which is made of the POM resin, and the outer circumferential sidewall 308a of the pump housing 308, which is made of metal, is shortened, so that the charge charged on the body 324 moves to the pump housing 308. As the distance between the inner circumferential sidewall 325a of the inner cylinder 325 and the outer circumferential sidewall 308a of the pump housing 308 becomes small, the charge easily moves. As the facing area between the inner circumferential sidewall 325a of the inner cylinder 325 and the outer circumferential sidewall 308a of the pump housing 308 becomes large, the charge moves easily. Accordingly, the distance between the inner circumferential sidewall 325a of the inner cylinder 325 and the outer circumferential sidewall 308a of the pump housing 308 becomes smaller than 1 mm, and the inner cylinder 325 of the body 324 covers more than 50 percents of the outer circumference of the pump housing 308, so that the charged voltage of the filter casing 322 becomes below 2 kV.

The charge charged on the fuel filter 320 moves to the pump housing 308 of the fuel pump 302 through the body 324 of the filter casing 322, which is made of the POM resin. In this case, the volume resistivity of the POM resin is large, so that the moving velocity of the electric charge moving from the body 324 to the pump housing 308 becomes slow. Therefore, the charge moves by corona discharge. The charge moves to the pump housing 308 of the fuel pump 302, and then moves to the connector 14 through a conductor in the fuel pump. Finally, the charge moves to a battery (not shown). Besides, when the filter casing 322 is made of conductive resin, the moving velocity of the electric charge moving from the body 324 to the pump housing 308 becomes quick. Therefore, the charge may move by spark discharge.

The distance between the inner cylinder 325 and the pump housing 308 is below the predetermined distance. The above construction is provided for solving the following problems.

When the fuel passes through the filter element 78, which is accommodated in the filter casing 322, the fuel filter 320 is charged up by friction between the fuel and the non-conductive filter element 78. Therefore, it is necessary to discharge the static electricity from the charged fuel filter 320. However, the filter casing 322 is made of resin in general, so that it is difficult to discharge the static electricity through the filter casing 322. Here, the static electricity charged on the fuel filter 320 sometimes reaches up to tens kV. Therefore, when the high voltage, which exceeds to the dielectric strength of material, for example, the material composing the filter casing 322, is applied to the filter casing 322 for a long time, the resin made filter casing may be broken. Moreover, some parts disposed near the charged filter casing 322 may be charged by induction charging.

In view of the above-described problems, it is considered that the filter casing 322 and/or the filter element 78 are made of conductive material. In a prior art, the filter casing is made of conductive resin, the conductivity of which is promoted, for example, by adding carbon. Similarly, the filter element in the prior art is made of conductive filter paper, the conductivity of which is promoted by adding carbon. However, the conductive resin and the conductive filter paper are expensive, so that the manufacturing cost of the pump module increases. Further, the distance between the fuel pump and the filter casing is a certain distance so as to reduce the vibration and noise of the fuel pump operation. Therefore, even when the conductivities of the filter casing and/or the filter element are promoted, the electric grounding between the filter casing and other conductive parts such as the fuel pump is necessitated. As a result, an additional part for grounding the filter casing is necessitated, so that the number of parts of the pump module increases.

In this embodiment, although the filter casing is made of non-conductive resin, the electric charge can be conducted more or less through the filter casing. Therefore, the distance between the pump housing and the filter casing is set to be a certain distance so that the charge can be discharged from the filter casing to the pump housing of the fuel pump. Therefore, the charge is discharged without adding an additional part and without using the expensive conductive resin. Thus, the electric charge accumulated on the filter casing is discharged from the filter casing to the metallic pump housing.

As a result, the relative position between the fuel pump 302 and the fuel filter 320 disposed outside the outer circumference of the fuel pump 302 is determined in such a manner that the charged voltage of the filter casing 322 becomes below 2 kV. Therefore, the damage of the resin parts such as the filter casing 322 by discharging the static charge can be reduced. Therefore, the filter casing 322 is not required to be formed of conductive resin, which is expensive. Moreover, no part for grounding the filter casing 322 is necessitated, so that the number of the parts can be reduced.

In this embodiment, the inner cylinder 325 of the body 324 is thinner than the outer cylinder 326. Therefore, when the fuel flows from the fuel pump to the filter element 78, which is accommodated between the inner cylinder 325 and the outer cylinder 326, the inner cylinder 325 deforms larger than the outer cylinder 326 by the fuel pressure. The inner cylinder 325 deforms toward the pump housing 308 side of the fuel pump 302, i.e., the radial inner side of the fuel pump 302, so that the distance between the inner circumferential sidewall 325a of the inner cylinder 325 and the outer circumferential sidewall 308a of the pump housing 308 of the fuel pump 302 is shortened. Therefore, the movement of the electric charge moving from the filter casing to the pump housing 308 of the fuel pump 302 is promoted.

The filter casing 322 is made of the POM resin. However, the filter casing can be made of non-conductive resin, the volume resistivity of which is in the range of $10^{12}$ Ωcm and $10^{15}$ Ωcm.

Twelfth Embodiment

Figure 23:
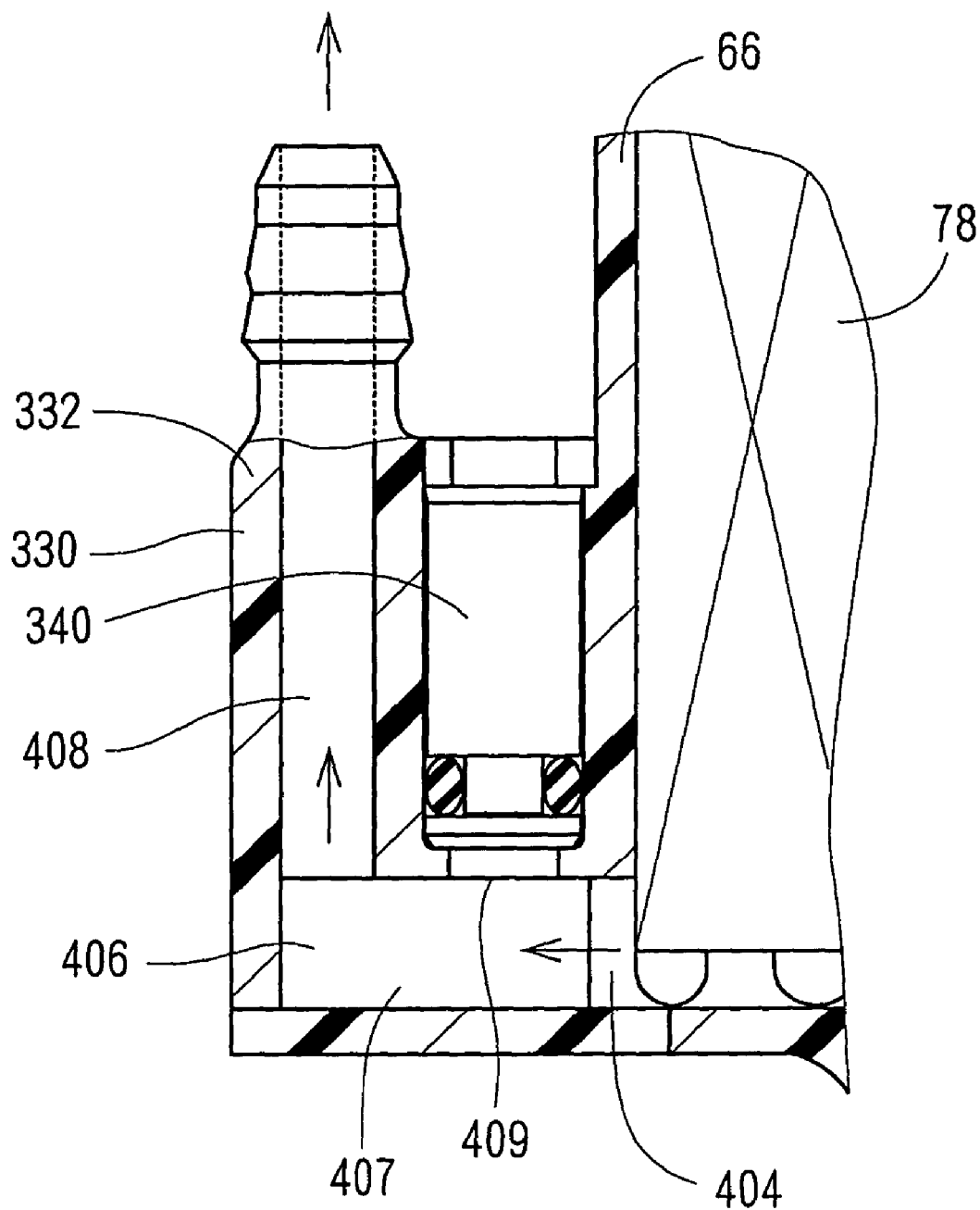
FIG. 23 is a partial cross-sectional view showing around a pressure regulator of a pump module according to the twelfth embodiment of the present invention.

A pump module according to the twelfth embodiment of the present invention is shown in FIG. 23.

An entire pressure regulator 340 is disposed between an outlet portion 332 of the fuel outlet 330 providing the outlet passage 408 and the outer cylinder 66. The entire pressure regulator 340 overlaps with the outer cylinder 66 in a range of the axial direction. An inlet passage of the pressure regulator 340 does not connect directly to a retrieve passage 407. A regulator inlet 409 connecting to the inlet passage of the pressure regulator 340 opens to the retrieve passage 407.

The entire pressure regulator 340 is disposed between the outlet portion 332 of the fuel outlet 330 providing the outlet passage 408 and the outer cylinder 66. Therefore, the pressure regulator 340 does not extrude from the outer cylinder 66 in the axial direction, so that the length of the pump module in the axial direction is limited from increasing even when the pressure regulator 340 is mounted on the pump module.

In this embodiment, the discharge opening 404 is disposed on a sidewall of the outer circumference of the filter casing. The retrieve passage 407 extends from the discharge opening 404 to the outer circumferential side. The regulator inlet opens to the retrieve passage 407, and connects to the inlet passage of the pressure regulator. Therefore, the fuel flows from the discharge opening 404 of the filter casing, and then the fuel is introduced into the pressure regulator before the fuel passes through a bent passage. Thus, the fuel before passing through the bent passage does not provide a pressure loss according to passing through the bent passage, so that the discharge pressure of the fuel pump 32 is limited from increasing. Moreover, the inlet passage of the pressure regulator can be disposed closely to the discharge opening 404 of the filter casing as close as possible. Accordingly, the pressure loss in passages is reduced, so that the discharge pressure of the fuel pump 32 is limited from increasing. Therefore, the fuel pump is not required to increase its size and its power consumption.

(Modifications)

In the above embodiments, the pressure regulator 80, 142, 340 is disposed outside the outer circumference of the filter casing 62, 122, 132, 154, 164, 184, 212, 242, 322, so that a part of the pressure regulator 80, 142, 340 overlaps with the filter casing 62, 122, 132, 154, 164, 184, 212, 242, 322 in the range of the center axial direction. Therefore, the actual length of the filter casing 62, 122, 132, 154, 164, 184, 212, 242, 322 and the pressure regulator 80, 142, 340 assembled in the pump module 30, 110, 120, 130, 140, 150, 160, 180, 200, 240, 300 in the axial direction is shortened, so that the whole length of the pump module 30, 110, 120, 130, 140, 150, 160, 180, 200, 240, 300 in the axial direction is shortened.

Moreover, the thick non-woven cloth is used as the suction filter 58. Therefore, contaminants, which are caught by only the filter element in the related art, can be also caught by the suction filter 58. Since there is a dead space around the fuel pump 32, 156, 170, 190, 202, 302 of the pump module 30, 110, 120, 130, 140, 150, 160, 180, 200, 240,300, even when the suction filter 58 becomes larger in accordance with the thick suction filter 58, the pump module 30, 110, 120, 130, 140, 150, 160, 180, 200, 240, 300 does not become large substantially. The capture capacity of the suction filter 58 for catching the contaminants are promoted, so that the capture capacity of the filter element 78, 124, 134, which is also required to catch the contaminants, can be reduced. As a result, the total capture capacity for catching the contaminants can be promoted without enlargement of the filter element 78, 124, 134. Moreover, the life time of the filter element 78, 124, 134 becomes longer.

In the above embodiments, the body 64, 324 of the filter casing 62, 122, 132, 154, 164, 184, 212, 242, 322 and the fuel outlet 70, 330 are integrally made of resin. Here, the fuel outlet 70, 330 retrieves the fuel from the discharge opening 404 of the filter casing 62, 122, 132, 154, 164, 184, 212, 242, 322. However, the fuel outlet 70, 330 can be formed as a separate part, which is separated from the body 64, 324. Although the fuel outlet 70, 330 for retrieving the fuel from the discharge opening 404 of the filter casing 62, 122, 132, 154, 164, 184, 212, 242, 322 includes the outlet passage 408, which is bent from the retrieve passage 407 along with the center axis 100, the fuel outlet 70, 330 can include only the retrieve passage 407 extending from the discharge opening 404 of the filter casing 62, 122, 132, 154, 164, 184, 212, 242, 322 to the outer circumferential side without including the outlet passage 408.

It is assumed that the pressure regulator 80, 142, 340 is disposed outside the outer circumference of the filter casing 62, 122, 132, 154, 164, 184, 212, 242, 322, and the retrieve passage 407 is opened to the regulator inlet 82, 409 for introducing the fuel into the pressure regulator 80, 142, 340. Here, the retrieve passage 407 extends from the discharge opening 404 disposed on a sidewall of the outer circumference of the filter casing 62, 122, 132, 154, 164, 184, 212, 242, 322 to the outer circumferential side. In this case, the fuel inlet 68, 166, 218 of the filter casing 62, 122, 132, 154, 164, 184, 212, 242, 322 may not be engaged to the inner circumferential side of the discharge portion 34, 172, 205 of the fuel pump 32, 156, 170, 190, 202, 302 in the axial direction, and the check valve 79 may not be accommodated in the fuel inlet 68, 166, 218 of the filter casing 62, 122, 132, 154, 164, 184, 212, 242, 322. For example, the fuel inlet 68, 166, 218 of the filter casing 62, 122, 132, 154, 164, 184, 212, 242, 322 and the discharge portion 34, 172, 205 of the fuel pump 32, 156, 170, 190, 202, 302 can be connected with another part. Moreover, the pressure regulator 80, 142, 340 may not be disposed in the projection region of the filter casing 62, 122, 132, 154, 164, 184, 212, 242, 322, which is provided by projecting the filter casing 62, 122, 132, 154, 164, 184, 212, 242, 322 in the axial direction. That is, the pressure regulator 80, 142, 340 and the filter casing 62, 122, 132, 154, 164, 184, 212, 242, 322 do not overlap each other in the radial direction, so that they are separated each other. Further, when the pump module 30, 110, 120, 130, 140, 150, 160, 180, 200, 240, 300 is mounted in the sub-tank 20, the length of the pressure regulator 80, 142, 340 in the axial direction can be shorter than a distance between the bottom of the filter casing 62, 122, 132, 154, 164, 184, 212, 242, 322 and the inner bottom surface of the sub-tank 20.

Further, it is assumed that the fuel inlet 68, 166, 218 of the fuel filter 60, 152, 162, 182, 210, 320 is engaged to the inner circumferential side of the discharge portion 34, 172, 205 of the fuel pump 32, 156, 170, 190, 202, 302, and the check valve 79 is accommodated in the fuel inlet 68, 166, 218 of the fuel filter 60, 152, 162, 182, 210, 320. In this case, the pressure regulator 80, 142, 340 can be disposed on the upper or lower side of the filter casing 62, 122, 132, 154, 164, 184, 212, 242, 322 instead of on the outer circumferential side of the filter casing 62, 122, 132, 154, 164, 184, 212, 242, 322.

Moreover, the pressure regulator 80, 142, 340 may not be disposed in the projection region of the filter casing 62, 122, 132, 154, 164, 184, 212, 242, 322, which is provided by projecting the filter casing 62, 122, 132, 154, 164, 184, 212, 242, 322 in the axial direction. Further, when the pump module 30, 110, 120, 130, 140, 150, 160, 180, 200, 240, 300 is mounted in the sub-tank 20, the length of the pressure regulator 80, 142, 340 in the axial direction can be shorter than a distance between the bottom of the filter casing 62, 122, 132, 154, 164, 184, 212, 242, 322 and the inner bottom surface of the sub-tank 20.

Further, it is assumed that the pressure regulator 80, 142, 340 is disposed outside the outer circumference of the filter casing 62, 122, 132, 154, 164, 184, 212, 242, 322, and a part of the pressure regulator 80, 142, 340 is disposed in the projection region of the filter casing 62, 122, 132, 154, 164, 184, 212, 242, 322, which is provided by projecting the filter casing 62, 122, 132, 154, 164, 184, 212, 242, 322 in the axial direction. In this case, the regulator inlet 82, 409 for introducing the fuel into the pressure regulator 80, 142, 340 can be opened to the outlet passage 408, which is disposed downstream from the discharge opening 404 disposed on a sidewall of the outer circumference of the filter casing 62,. 122, 132, 154, 164, 184, 212, 242, 322. The outlet passage 408 is also disposed after bending the passage. Further, the discharge opening 404 of the filter casing 62, 122, 132, 154, 164, 184, 212, 242, 322 can be disposed on the top surface or the bottom surface of the filter casing 62, 122, 132, 154, 164, 184, 212, 242, 322. Moreover, the fuel inlet 68, 166, 218 of the filter casing 62, 122, 132, 154, 164, 184, 212, 242, 322 may not be engaged to the inner circumferential side of the discharge portion 34, 172, 205 of the fuel pump 32, 156, 170, 190, 202, 302 in the axial direction, and the check valve 79 may not be accommodated in the fuel inlet 68, 166, 218 of the filter casing 62, 122, 132, 154, 164, 184, 212, 242, 322. Further, when the pump module 30, 110, 120, 130, 140, 150, 160, 180, 200, 240, 300 is mounted in the sub-tank 20, the length of the pressure regulator 80, 142, 340 in the axial direction can be shorter than a distance between the bottom of the filter casing 62, 122, 132, 154, 164, 184, 212, 242, 322 and the inner bottom surface of the sub-tank 20.

Further, it is assumed that the pressure regulator 80, 142, 340 is disposed outside the outer circumference of the filter casing 62, 122, 132, 154, 164, 184, 212, 242, 322, and the length of the pressure regulator 80, 142, 340 in the axial direction is longer than a distance between the bottom of the filter casing 62, 122, 132, 154, 164, 184, 212, 242, 322 and the inner bottom surface of the sub-tank 20 when the pump module 30, 110, 120, 130, 140, 150, 160, 180, 200, 240, 300 is mounted in the sub-tank. In this case, the discharge opening of the filter casing 62, 122, 132, 154, 164, 184, 212, 242, 322 can be disposed on the top surface or the bottom surface of the filter casing 62, 122, 132, 154, 164, 184, 212, 242, 322. Moreover, the fuel inlet of the filter casing 62, 122, 132, 154, 164, 184, 212, 242, 322 may not be engaged to the inner circumferential side of the discharge portion 34, 172, 205 of the fuel pump 32, 156, 170, 190, 202, 302 in the axial direction, and the check valve 79 may not be accommodated in the fuel inlet 68, 166, 218 of the filter casing 62, 122, 132, 154, 164, 184, 212, 242, 322. Further, the pressure regulator 80, 142, 340 may not be disposed in the projection region of the filter casing 62, 122, 132, 154, 164, 184, 212, 242, 322, which is provided by projecting the filter casing 62, 122, 132, 154, 164, 184, 212, 242, 322 in the axial direction.

In the above embodiments, although the excess fuel is discharged from the pressure regulator 80, 142, 340 to the upper or lower side of the pressure regulator 80, 142, 340, the excess fuel can be discharged to a transverse direction of the pressure regulator 80, 142, 340.

Further, the pump module 30, 110, 120, 130, 140, 150, 160, 180, 200, 240, 300 is accommodated in the sub-tank 20 disposed in the fuel tank 1. However, the pump module 30, 110, 120, 130, 140, 150, 160, 180, 200, 240, 300 can be disposed in the fuel tank 1 directly.

Such changes and modifications are to be understood as being within the scope of the present invention as defined by the appended claims.

What is claimed is:

1. A pump module comprising:
a fuel pump having a center axis of an outer circumference;
a fuel filter including a filter casing and a filter element, the filter casing having
an outer circumference;
a pressure regulator for regulating pressure of fuel discharged from the fuel pump through the fuel filter; and
a check valve for preventing the fuel from flowing back to the fuel pump, the fuel being discharged from the fuel pump,
wherein the check valve is disposed on an upstream side of the fuel filter so that the check valve stops fuel flow from the downstream side to the upstream side,
wherein the fuel pump includes a discharge portion having an inner circumference for discharging the fuel,
wherein the filter casing covers at least a part of the outer circumference of the fuel pump,
wherein the filter element is accommodated in the filter casing, and eliminates contaminants in the fuel discharged from the fuel pump,
wherein the fuel filter includes a fuel inlet, which is engaged to the side of the inner circumference of the discharge portion in the center axial direction of the fuel pump and an O-ring disposed on a downstream side of the check valve,
wherein the check valve is accommodated in an inner surface of the fuel inlet of the fuel filter,
wherein the fuel inlet of the fuel filter is accommodated within the inner circumference of the discharge portion of the fuel pump,
wherein the O-ring seals between the discharge portion of the fuel pump and the fuel inlet of the fuel filter.

2. The pump module according to claim 1,
wherein the fuel inlet, the discharge portion, and the check valve overlap each other in a range of the center axial direction.

3. The pump module according to claim 1,
wherein the pressure regulator is disposed outside the outer circumference of the filter casing.

4. The pump module according to claim 3,
wherein the pressure regulator is disposed on a sidewall of the outer circumference of the filter casing.

5. The pump module according to claim 3,
wherein the filter casing includes an discharge opening disposed on the sidewall of the outer circumference of the filter casing, and
wherein the fuel flows from the filter element through the discharge opening.

6. The pump module according to claim 1,
wherein the filter casing includes a body for accommodating the filter element and a cover for covering an opening of the body, the body being integrally made of resin.

7. The pump module according to claim 1,
wherein a part of the pressure regulator is disposed in a projection region of the filter casing, the projection region being provided by projecting the filter casing in the center axial direction of the fuel pump.

8. The pump module according to claim 1,
wherein the filter casing covers entirely the outer circumference of the fuel pump.

9. The pump module according to claim 1,
wherein a length of the filter casing in the center axial direction of the fuel pump is substantially equal to a length of the fuel pump in the center axial direction.

10. The pump module according to claim 9,
wherein a length of the filter element in the center axial direction is substantially equal to a length of the fuel pump in the center axial direction.

11. The pump module according to claim 1,
wherein the discharge portion of the fuel pump is disposed on the center axis of the fuel pump.

12. The pump module according to claim 1,
wherein a flow direction of the excess fuel flowing from the filter casing into the pressure regulator is the same as a fuel direction of the excess fuel being discharged from the pressure regulator.

13. The pump module according to claim 1,
wherein a flow direction of the excess fuel flowing from the filter casing into the pressure regulator is different from a flow direction of the excess fuel being discharged from the pressure regulator.

14. A pump module comprising:
a fuel pump having a center axis of an outer circumference;
a fuel filter including a filter casing and a filter element, the filter casing having an outer circumference;
a fuel outlet disposed outside the outer circumference of the filter casing; and
a pressure regulator for regulating pressure of fuel discharged from the fuel pump through the fuel filter,
wherein the filter casing covers at least a part of the outer circumference of the fuel pump,
wherein the filter element is accommodated in the filter casing, and eliminates contaminants in the fuel discharged from the fuel pump,
wherein the fuel outlet includes an outflow passage for flowing the fuel from a discharge opening of the filter casing,
wherein the pressure regulator is disposed outside the outer circumference of the filter casing,
wherein the discharge opening is disposed on a sidewall of the outer circumference of the filter casing,
wherein the outflow passage includes a retrieve passage extending from the discharge opening to the outer circumference of the filter casing, and
wherein the pressure regulator includes a regulator inlet for introducing the fuel, the regulator inlet being opened to the retrieve passage,
wherein the filter casing includes a body and a cover,
wherein the body is integrally made of resin, has an opening, and accommodates the filter element,
wherein the cover covers the opening of the body,
wherein the fuel filter includes a fuel outlet having an outlet passage and a through hole,
wherein the fuel outlet connects to the discharge opening of the filter casing, and is made of resin and integrated with the body,
wherein the through hole penetrates through the fuel outlet, and
wherein the pressure regulator is inserted in the through hole of the fuel outlet so that the pressure regulator covers one open end of the through hole, the pressure regulator discharges an excess fuel from the other open end of the through hole, and the pressure regulator includes an inlet passage connecting to the outlet passage of the fuel filter.

15. A pump module comprising:
a fuel pump having a center axis of an outer circumference;
a fuel filter including a filter casing and a filter element, the filter casing having an outer circumference;
a fuel outlet disposed outside the outer circumference of the filter casing; and
a pressure regulator for regulating pressure of fuel discharged from the fuel pump through the fuel filter,
wherein the filter casing covers at least a part of the outer circumference of the fuel pump,
wherein the filter element is accommodated in the filter casing, and eliminates contaminants in the fuel discharged from the fuel pump,
wherein the fuel outlet includes an outflow passage for flowing the fuel from a discharge opening of the filter casing,
wherein the pressure regulator is disposed outside the outer circumference of the filter casing,
wherein the discharge opening is disposed on a sidewall of the outer circumference of the filter casing,
wherein the outflow passage includes a retrieve passage extending from the discharge opening to the outer circumference of the filter casing, and
wherein the pressure regulator includes a regulator inlet for introducing the fuel, the regulator inlet being opened to the retrieve passage,
wherein the filter casing includes an inner cylinder having inner and outer circumferences and an outer cylinder disposed outside the outer circumference of the inner cylinder,
wherein the filter casing accommodates the filter element between the inner and outer cylinders,
wherein the inner cylinder covers entirely the outer circumference of the fuel pump,
wherein an upper periphery of the fuel pump and a sidewall of the inner circumference of the inner cylinder provide an upper concavity when the pump module is mounted,
wherein the pump module further includes a drain passage for draining water from upside to downside between the fuel pump and the inner cylinder, the drain passage having at least one passage and being disposed between the sidewall of the outer circumference of the fuel pump and the sidewall of the inner circumference of the inner cylinder, and
wherein the sidewall of the outer circumference of the fuel pump and the sidewall of the inner circumference of the inner cylinder are adhered together or have a clearance therebetween, the clearance preventing water from dropping therethrough.

16. A pump module comprising:
a fuel pump having a center axis of an outer circumference;
a fuel filter including a filter casing and a filter element, the filter casing having an outer circumference;
a fuel outlet disposed outside the outer circumference of the filter casing; and
a pressure regulator for regulating pressure of fuel discharged from the fuel pump through the fuel filter, wherein the filter casing covers at least a part of the outer circumference of the fuel pump,
wherein the filter element is accommodated in the filter casing, and eliminates contaminants in the fuel discharged from the fuel pump,
wherein the fuel outlet includes an outflow passage for flowing the fuel from a discharge opening of the filter casing,
wherein the pressure regulator is disposed outside the outer circumference of the filter casing,
wherein the discharge opening is disposed on a sidewall of the outer circumference of the filter casing,
wherein the outflow passage includes a retrieve passage extending from the discharge opening to the outer circumference of the filter casing, and
wherein the pressure regulator includes a regulator inlet for introducing the fuel, the regulator inlet being opened to the retrieve passage,
wherein the fuel pump includes a discharge portion for discharging the fuel, the discharge portion being disposed on one end of the fuel pump in the center axial direction,
wherein the filter casing includes an inner cylinder having an outer circumference, an outer cylinder disposed outside the outer circumference of the inner cylinder, and an accommodation chamber for accommodating the filter element,
wherein the accommodation chamber is disposed between the inner and outer cylinders, and has a ring-shape cross-section,
wherein the inner cylinder covers the outer circumference of the fuel pump,
wherein the fuel pump includes an electric receiving terminal for being electrically connectable to a power supply terminal disposed on one end of a power supply cable, which supplies an electric power to the fuel pump, the electric receiving terminal being disposed on one end of the discharge portion,
wherein the filter casing further includes a covert for covering the one end of the discharge portion of the fuel pump, the covert contacting each open periphery of the inner and outer cylinders,
wherein the covert includes a fuel passage and a power supply passage,
wherein the fuel passage connects to both the discharge portion and the accommodation chamber, and flows the fuel from the discharge portion to the accommodation chamber, the fuel being discharged from the fuel pump,
wherein a connection portion between the fuel passage and the discharge portion is sealed,
wherein the power supply passage does not connect to the fuel passage and is disposed on the periphery of the power supply terminal of the power supply cable, and
wherein the power supply terminal is exposed.

17. A pump module comprising:
a fuel pump having a center axis of an outer circumference;
a fuel filter including a filter casing and a filter element, the filter casing having an outer circumference;
a fuel outlet disposed outside the outer circumference of the filter casing; and
a pressure regulator for regulating pressure of fuel discharged from the fuel pump through the fuel filter,
wherein the filter casing covers at least a part of the outer circumference of the fuel pump,
wherein the filter element is accommodated in the filter casing, and eliminates contaminants in the fuel discharged from the fuel pump,
wherein the fuel outlet includes an outflow passage for flowing the fuel from a discharge opening of the filter casing,
wherein the pressure regulator is disposed outside the outer circumference of the filter casing,
wherein the discharge opening is disposed on a sidewall of the outer circumference of the filter casing,
wherein the outflow passage includes a retrieve passage extending from the discharge opening to the outer circumference of the filter casing, and
wherein the pressure regulator includes a regulator inlet for introducing the fuel, the regulator inlet being opened to the retrieve passage,
wherein the fuel pump includes a metallic pump housing,
wherein the filter casing covers entirely the sidewall of the outer circumference of the pump housing, has a cylindrical shape, includes an inner cylinder disposed on the fuel pump side and an outer cylinder disposed outside the outer circumference of the inner cylinder, and is made of non-conductive resin, and
wherein a distance between the inner cylinder and the pump housing is smaller than a predetermined distance.

18. The pump module according to claim 1,
wherein the length of the pressure regulator in the center axial direction of the fuel pump is longer than a distance between a bottom surface of the filter casing and an inner bottom surface of a fuel tank, and
wherein the fuel pump sucks accumulated fuel in the fuel tank.

19. The pump module according to claim 1,
wherein the fuel pump sucks accumulated fuel in the fuel tank, and
wherein the center axis of the fuel pump is parallel to a vertical direction.

20. A pump module accommodated in a fuel tank and comprising:
a fuel pump having a center axis of an outer circumference;
a fuel filter including a filter casing and a filter element, the filter casing having an outer circumference;
a suction filter disposed on an upstream side of the fuel pump; and
a pressure regulator for regulating pressure of fuel discharged from the fuel pump through the fuel filter,
wherein the fuel filter is disposed on a downstream side of the fuel pump,
wherein the filter casing covers at least a part of the outer circumference of the fuel pump,
wherein the filter element is accommodated in the filter casing, and eliminates contaminants in the fuel discharged from the fuel pump,
wherein the pressure regulator is disposed radially outside the outer circumference of the filter casing,
wherein the pressure regulator includes a regulator inlet for receiving the fuel filtered by the fuel filter, the regulator inlet connecting to a passage of the fuel filter,
wherein a part of the pressure regulator is disposed in a projection region of the filter casing, the projection region being provided by projecting the filter casing in the center axial direction of the fuel pump
wherein a check valve is disposed in the filter casing which is accommodated within a discharge portion of the fuel pump.

21. A pump module accommodated in a fuel tank and comprising:
- a fuel pump having a center axis of an outer circumference;
- a fuel filter including a filter casing and a filter element, the filter casing having an outer circumference;
- a suction filter disposed on an upstream side of the fuel pump; and
- a pressure regulator for regulating pressure of fuel discharged from the fuel pump through the fuel filter,
- wherein the fuel filter is disposed on a downstream side of the fuel pump,
- wherein the filter casing covers at least a part of the outer circumference of the fuel pump,
- wherein the filter element is accommodated in the filter casing, and eliminates contaminants in the fuel discharged from the fuel pump,
- wherein the pressure regulator is disposed radially outside the outer circumference of the filter casing,
- wherein the pressure regulator includes a regulator inlet for receiving the fuel filtered by the fuel filter, the regulator inlet connecting to a passage of the fuel filter,
- wherein the length of the pressure regulator in the center axial direction of the fuel pump is longer than a distance between a bottom surface of the filter casing and an inner bottom surface of the fuel tank,
- wherein the fuel pump sucks accumulated fuel in the fuel tank,
- wherein a check valve is disposed in the filter casing which is accommodated within a discharge portion of the fuel pump.

22. A pump module accommodated in a fuel tank and comprising:
- a fuel pump having a center axis of an outer circumference;
- a fuel filter including a filter casing and a filter element, the filter casing having an outer circumference;
- a suction filter disposed on an upstream side of the fuel pump; and
- a pressure regulator for regulating pressure of fuel discharged from the fuel pump through the fuel filter,
- wherein the fuel filter is disposed on a downstream side of the fuel pump,
- wherein the filter casing covers at least a part of the outer circumference of the fuel pump, and is disposed around the center axis of the fuel pump,
- wherein the filter element is accommodated in the filter casing, and eliminates contaminants in the fuel discharged from the fuel pump, and
- wherein the pressure regulator is disposed radially outside the outer circumference of the filter casing,
- wherein the pressure regulator includes a regulator inlet for receiving the fuel filtered by the fuel filter, the regulator inlet connecting to a passage of the fuel filter,
- wherein a check valve is disposed in the filter casing which is accommodated within a discharge portion of the fuel pump.

23. The pump module according to claim 22,
- wherein the pressure regulator is disposed on a sidewall of the outer circumference of the filter casing.

24. A pump module comprising:
- a fuel pump having a center axis of an outer circumference;
- a fuel filter including a filter casing and a filter element, the filter casing having an outer circumference;
- a suction filter disposed on one end of the fuel pump in a center axial direction of the fuel pump, for eliminating contaminants in fuel sucked by the fuel pump; and
- a pressure regulator disposed on one end of the fuel filter in the center axial direction, for regulating pressure of the fuel discharged from the fuel pump through the fuel filter,
- wherein the filter casing covers at least a part of the outer circumference of the fuel pump, and is disposed around the center axis of the fuel pump,
- wherein the filter element is accommodated in the filter casing, and eliminates contaminants in the fuel discharged from the fuel pump,
- wherein the pressure regulator and the suction filter overlap each other in a range of the center axial direction, and
- wherein the suction filter faces the pressure regulator in a radial direction of the fuel pump.

25. The pump module according to claim 24,
- wherein the suction filter has an outer circumference with a concavity, which caves toward a center of the fuel pump, and
- wherein a part of the pressure regulator is disposed in the concavity.

26. The pump module according to claim 24,
- wherein the fuel pump and the suction filter are almost disposed on a same axis.

27. The pump module according to claim 24, further comprising:
- a check valve for preventing the fuel from flowing back to the fuel pump, the fuel being discharged from the fuel pump,
- wherein the fuel pump includes a discharge portion having an inner circumference,
- wherein the fuel filter includes a fuel inlet, which is engaged to the inner circumference of the discharge portion in the center axial direction, and
- wherein the check valve is accommodated in the fuel inlet.

28. The pump module according to claim 27,
- wherein the fuel inlet, the discharge portion, and the check valve overlap each other in the range of the center axial direction.

29. The pump module according to claim 24,
- wherein the pressure regulator is disposed outside the outer circumference of the filter casing.

30. The pump module according to claim 29,
- wherein the pressure regulator is disposed on a sidewall of the outer circumference of the filter casing.

31. The pump module according to claim 29,
- wherein a part of the pressure regulator is disposed in a projection region of the filter casing, the projection region being provided by projecting the filter casing in the center axial direction.

32. The pump module according to claim 29,
- wherein the filter casing includes an discharge opening disposed on a sidewall of the outer circumference of the filter casing, and
- wherein the fuel flows from the filter element through the discharge opening.

33. The pump module according to claim 29,
- wherein the length of the pressure regulator in the center axial direction is longer than a distance between a bottom surface of the filter casing and an inner bottom surface of a fuel tank, when the pump module is mounted on the fuel tank for accumulating the fuel, and
- wherein the fuel pump sucks the accumulated fuel.

34. The pump module according to claim 24,
wherein the filter casing includes a body for accommodating the filter element and a cover for covering an opening of the body, the body being integrally made of resin.

35. The pump module according to claim 24,
wherein the filter casing covers entirely the outer circumference of the fuel pump.

36. The pump module according to claim 24,
wherein a length of the filter casing in the center axial direction is substantially equal to a length of the fuel pump in the center axial direction.

37. The pump module according to claim 36,
wherein a length of the filter element in the center axial direction is substantially equal to a length of the fuel pump in the center axial direction.

38. The pump module according to claim 24,
wherein the discharge portion of the fuel pump is disposed on the center axis of the fuel pump.

39. The pump module according to claim 24,
wherein a flow direction of the fuel flowing from the filter casing into the pressure regulator is the same direction as a flow direction of the excess fuel being discharged from the pressure regulator.

40. The pump module according to claim 24,
wherein a flow direction of the fuel flowing from the filter casing into the pressure regulator is different from a flow direction of the excess fuel being discharged from the pressure regulator.

41. The pump module according to claim 24, mounted on a fuel tank accumulating the fuel,
wherein the fuel pump sucks the accumulated fuel, and
wherein the center axis of the fuel pump is parallel to a vertical direction.

42. A pump module comprising:
a fuel pump having a center axis of an outer circumference;
a fuel filter including a filter casing and a filter element, the filter casing having an outer circumference;
a suction filter disposed on one end of the fuel pump in a center axial direction of the fuel pump, for eliminating contaminants in fuel sucked by the fuel pump; and
a pressure regulator disposed on one end of the fuel filter in the center axial direction, for regulating pressure of the fuel discharged from the fuel pump through the fuel filter,
wherein the filter casing covers at least a part of the outer circumference of the fuel pump, and is disposed around the center axis of the fuel pump,
wherein the filter element is accommodated in the filter casing, and eliminates contaminants in the fuel discharged from the fuel pump,
wherein the pressure regulator and the suction filter overlap each other in a range of the center axial direction,
wherein the pressure regulator is disposed outside the outer circumference of the filter casing,
wherein the filter casing includes an discharge opening disposed on a sidewall of the outer circumference of the filter casing,
wherein the fuel flows from the filter element through the discharge opening,
wherein the filter casing includes a body and a cover,
wherein the body is integrally made of resin, has an opening, and accommodates the filter element,
wherein the cover covers the opening of the body,
wherein the fuel filter includes a fuel outlet having an outlet passage and a through hole,
wherein the fuel outlet connects to the discharge opening of the filter casing, and is made of resin and integrated with the body,
wherein the through hole penetrates through the fuel outlet, and
wherein the pressure regulator is inserted in the through hole of the fuel outlet so that the pressure regulator covers one open end of the through hole, the pressure regulator discharges an excess fuel from the other open end of the through hole, and the pressure regulator includes an inlet passage connecting to the outlet passage of the fuel filter.

* * * * *